(12) United States Patent
Warbis et al.

(10) Patent No.: US 10,898,903 B2
(45) Date of Patent: Jan. 26, 2021

(54) DEVICE, METHOD, AND CONTROL SYSTEM FOR WASTE TO ENERGY GENERATION AND OTHER OUTPUT PRODUCTS

(71) Applicant: EKAMOR, Cookeville, TN (US)

(72) Inventors: Kelly Warbis, Cookeville, TN (US); Mark Hutchins, Cookeville, TN (US); Roland Black, Cookeville, TN (US)

(73) Assignee: EKAMOR, Cookeville, TN (US)

( * ) Notice: Subject to any disclaimer, the term of this patent is extended or adjusted under 35 U.S.C. 154(b) by 0 days.

(21) Appl. No.: 16/457,431

(22) Filed: Jun. 28, 2019

(65) Prior Publication Data

US 2020/0001304 A1   Jan. 2, 2020

Related U.S. Application Data

(60) Provisional application No. 62/692,369, filed on Jun. 29, 2018.

(51) Int. Cl.
*B02C 25/00* (2006.01)
*B03B 9/06* (2006.01)
*B09B 3/00* (2006.01)

(52) U.S. Cl.
CPC .............. *B02C 25/00* (2013.01); *B03B 9/06* (2013.01); *B09B 3/0083* (2013.01); *B02C 2201/06* (2013.01); *F26B 2200/04* (2013.01)

(58) Field of Classification Search
CPC ....... B02C 23/14; B02C 19/22; B02C 19/186; B02C 19/0056; B02C 18/225; B02C 25/00; B09B 3/00; B09B 1/00; A01F 29/00

USPC .................................................... 241/64, 65
See application file for complete search history.

(56) References Cited

U.S. PATENT DOCUMENTS

| | | | | |
|---|---|---|---|---|
| 5,431,347 A | * | 7/1995 | Hayashi | ................ B02C 13/282 241/20 |
| 5,513,807 A | * | 5/1996 | Stricker | ................ B03B 9/061 241/152.2 |
| 5,630,553 A | * | 5/1997 | Serban | .................... B03B 9/061 241/23 |

(Continued)

OTHER PUBLICATIONS

American Pulverizer Company, TRS Series, Slow-Speed Shear-Type Shredders, Heavy Duty EG Series-Electric or Hydaulic, 10 Pages Total, (as viewed on May 14, 2017).

(Continued)

*Primary Examiner* — Faye Francis
(74) *Attorney, Agent, or Firm* — Arent Fox LLP

(57) ABSTRACT

Aspects of the present disclosure include devices, systems, methods, and control systems for processing waste into usable products, such as fuel stock, soil additives, and usable byproducts. Various system components may include: 1) a material loading area; 2) a pre-shredder; 3) a magnet based separator; 4) an eddy current separator; 5) additional sorting devices, such as a ballistic separator and/or an optical separator; 6) a mechanical pulverizer, such as a vertical shaft impactor (VSI); 7) a moisture separation device, such as a cyclone; 8) a compressor, such as a ram baler; 9) a packager, such as a bale wrapper; 10) analyzers, such as for moisture and caloric data analysis; 11) a thermal pressure chamber, such as a thermal screw; and 12) a control system to control operation of the system.

20 Claims, 22 Drawing Sheets

(56) References Cited

U.S. PATENT DOCUMENTS

| | | | | |
|---|---|---|---|---|
| 5,636,941 | A * | 6/1997 | Davis | B09B 1/00 405/129.95 |
| 5,908,165 | A * | 6/1999 | Guschall | B03B 9/061 241/23 |
| 6,325,311 | B1 * | 12/2001 | Preisser | B03B 9/063 241/299 |
| 7,775,466 | B2 * | 8/2010 | Grasso, Jr. | C04B 14/22 241/24.22 |
| 8,490,904 | B2 * | 7/2013 | Liubakka | C22B 1/00 241/152.2 |
| 8,877,992 | B2 * | 11/2014 | Appel | B09B 3/0083 585/240 |
| 10,532,362 | B2 * | 1/2020 | Torres Aso | B02C 18/22 |
| 2009/0062581 | A1 * | 3/2009 | Appel | B09B 3/00 585/241 |
| 2010/0090037 | A1 * | 4/2010 | Hood | B02C 18/0084 241/23 |
| 2011/0031336 | A1 * | 2/2011 | Stevens | H01M 10/54 241/23 |
| 2012/0186491 | A1 * | 7/2012 | Cuypers | C03C 13/06 106/439 |
| 2014/0069798 | A1 * | 3/2014 | Hayward | B09B 3/0083 201/8 |
| 2016/0045919 | A1 | 2/2016 | McDaniel et al. | |
| 2017/0190975 | A1 * | 7/2017 | Hayward | C10B 7/10 |
| 2019/0091739 | A1 * | 3/2019 | Benedek | C12P 5/023 |

OTHER PUBLICATIONS

Dings Magnetic Group Co., Eccentric Rotor Eddy Current Separators, Non-Ferrous Separation, ECS-0001 May 2016, 8 Pages Total, (as viewed on May 14, 2017).

Dings Magnetic Group Co., Magnetic Deep Draw Drums, for Heavy-Duty, High-Volume Ferrous Separation, DDD-0001 Sep. 2016, 8 Pages Total, (as viewed on May 14, 2017).

Hustler Conveyor Company, New From Hustler Conveyor, Adjustable Drum Feeders, http://www.hustler-conveyor.com/contact.html, 2 Pages Total, (Jun. 26, 2017).

Imperial Systems, Imperial Systems Model ISH Cyclone, Quote # PM17014R-2, Model: ISH-74-10 (QTY: 2), Application: Fiberglass, Total CFM: 30, 000, Company: Atchison Engineering, 8 Pages Total, (Jun. 2, 2017).

Imperial Systems, Imperial Systems Model ISH Cyclone, Quote # PM17017R1, Model: ISH-74-10. (QTY: 3), Application: Fiberglass, Total CFM: 50, 000, Company: Atchison Engineering, 9 Pages Total, (Jun. 2, 2017).

Imperial Systems, Inc., Heavy Duty Airlocks, Imperial Systems, Inc., Heavy Duty Airlocks are engineered to outlast all other airlocks., 4 pages total, (as viewed on May 14, 2017).

Maren Balers & Shredders, ProPAK 60 full eject baler, Smart Bale, Intelligent Baler Control, 3 pages total, (as viewed on May 14, 2017).

Pellenc, Stat Pack: A software Package that sorts and Analyzes in Real Time, www.pellencst.com, 4 Pages Total, (as viewed on May 14, 2017).

Sebright Products Inc., Vertical Shaft Impactor with Stand for Testing, Preliminary Drawing; 21 Pages Total, (Printed Date: Oct. 10, 2013).

Sierra., REB-2: Two-Ram Baler, www.sierraintl.com, 2 pages total, (as viewed on May 14, 2017).

Steinert, Unisort-Analyzer, Quality Control with NIR Analysis, 2 pages total, www.steinert.de, (as viewed on May 14, 2017).

Therma-Flite Therma-Flite IC Series BIO-SCRU Biosolids Dryer System, BIO-SCRU—Class A Biosolids Dryer, Sludge Dryers Equipment—Therma-Flite, (2 Pages Total), http://www.therma-flite.com/bioscru.php, retrieved on Jun. 27, 2017.

* cited by examiner

165

DEVICE, METHOD, AND CONTROL SYSTEM FOR WASTE TO ENERGY GENERATION AND OTHER OUTPUT PRODUCTS

CROSS-REFERENCE TO RELATED APPLICATIONS

This application claims priority to U.S. Provisional Application No. 62/692,369 titled "DEVICE, METHOD, AND CONTROL SYSTEM FOR WASTE TO ENERGY GENERATION AND OTHER OUTPUT PRODUCTS," filed Jun. 29, 2018, which is incorporated herein by reference in its entirety.

TECHNICAL FIELD

Aspects of the disclosure relate generally to the field of waste processing and production of energy and other output products, such as fuel products and soil additives.

BACKGROUND

There remains an unmet need for methods, systems, devices, and control systems for processing waste into usable products, such as fuel stock, soil additives, and usable byproducts.

SUMMARY

Aspects of the present disclosure include devices, systems, methods, and control systems for processing waste into usable products, such as fuel stock, soil additives, and usable byproducts.

Aspects of the system may include processing of one or more feedstocks that may include, for example, garbage (including organics), biosolids, agricultural waste, paper pulp, green waste, digestate, and/or other biomass, as well as other materials. The feedstocks may be dried and otherwise processed, such as by pulverizing, which, among other things, may result in production of water from the drying and other processing.

Various components of an example system for processing of the waste in accordance with aspects of the present disclosure may include one or more of: 1) a material loading area, which may arrive for example, on a tipping floor area; 2) a pre-shredder, such as a pulverizer/dryer; 3) a magnet based separator; 4) an eddy current non-magnetic metals separator; 5) additional sorting devices, such as a ballistic separator and/or an optical separator, optionally including one or more sorting observation areas; 6) a mechanical separator, which may include or further include one or more vertical shaft impactors (VSIs); 7) one or more moisture separation devices, such as one or more cyclones; 8) a compressor, such as one or more ram balers; 9) a packager, such as one or more bale wrappers; and 10) one or more material analyzers, such as moisture and caloric data analysis and collection devices.

Output of the feedstock from drying and other processing may include production of a fluff, which, alternatively to compressed and packaged, may be used to produce pellets or other output (e.g., syngas), via additional processing, such as pyrolysis. The pyrolization process may also be used, for example, to produce biochar. The syngas process and/or biochar process, for example, may in turn be used in production of biocoal, biooil, advanced bioproducts, and synthetic natural gas, and/or may be used for combine cycle generation, soil amendment products, filtration products, activate carbon precursors, and/or activated carbon products.

Additional aspects of the systems, devices, and methods of the present disclosure may include a control system for managing and/or controlling the monitoring, operation, and/or interoperation of the various processing devices within a processing system. One example implementation of a control system in accordance with aspects of the present disclosure may include use of a matrix bus and various devices and processes connectable via machine to machine interfaces for receiving parameters, providing mechanisms/algorithms for adjusting parameters, otherwise providing monitoring devices of the system, and providing and controlling communications and performing functions to, from, by, and among the devices of the system. Among other things, control via such matrix bus may allow the control system to recognize data from the devices and processes, control overall operation of the system, determine whether each device/process is functioning properly, control operation of each device/process (e.g., speed up or slow down each device/process), input changes to operational parameters and/or other characteristics of operation, including for use in tailoring certain product outputs from the system, such as fuel characteristics, schedule and monitor maintenance and other routine operations, use video and IR thermography for various analytics for the system, monitor and control various electrically operated features, such as conveyors, gates, doors, and other electrically driven system components, enable override of various subsystem components, analyze moisture in the feedstock and other aspects of the processing, and assess the presence of and assist in monitoring and controlling hazardous materials.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure include devices, systems, methods of operation, and control systems for processing waste into usable products, such as fuel stock, soil additives, and usable byproducts.

An overview of example system components and process in accordance with aspects of the present disclosure will now be described.

Figure 1:
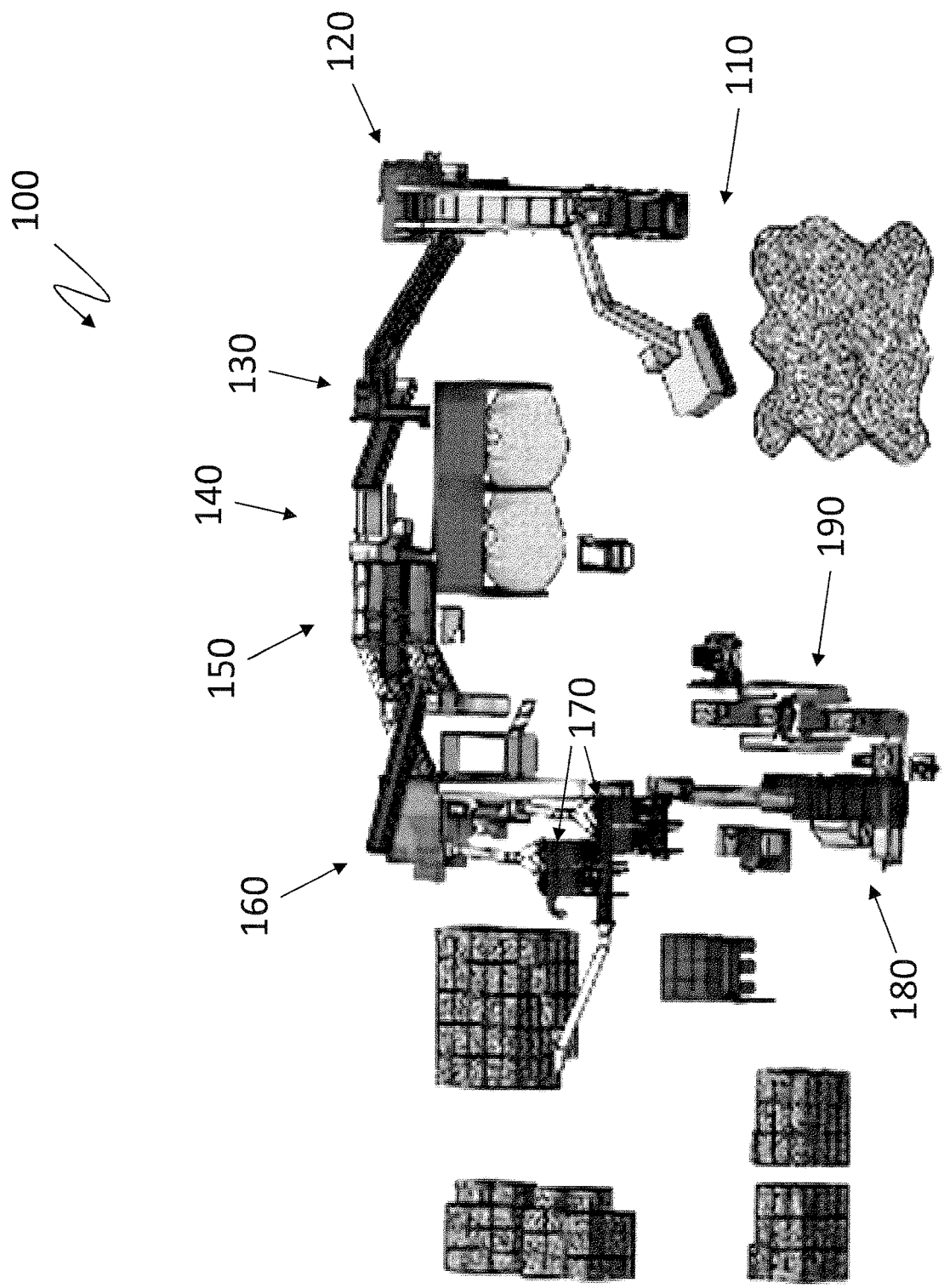
FIG. 1 shows various example system components in accordance with aspects of the present disclosure.

A first example of various system components in accordance with aspects of the present disclosure is shown in FIG. 1. In FIG. 1, a first portion 100 of such example system may include one or more of: 1) a material loading area 110, which may arrive for example, on a tipping floor area; 2) a pre-shredder 120, such as a pulverizer/dryer; 3) a magnet based separator 130; 4) an eddy current separator 140; 5) additional sorting devices 150, such as a ballistic separator, an optical sorter to remove high value plastics, for example, and optionally a sorting observation area; 6) a mechanical separator 160, which may include or further include one or more VSIs; 7) one or more moisture separation devices 170, such as one or more cyclones; 8) a compressor 180, such as one or more ram balers; and 9) a packager 190, such as one or more bale wrappers.

Figure 2:
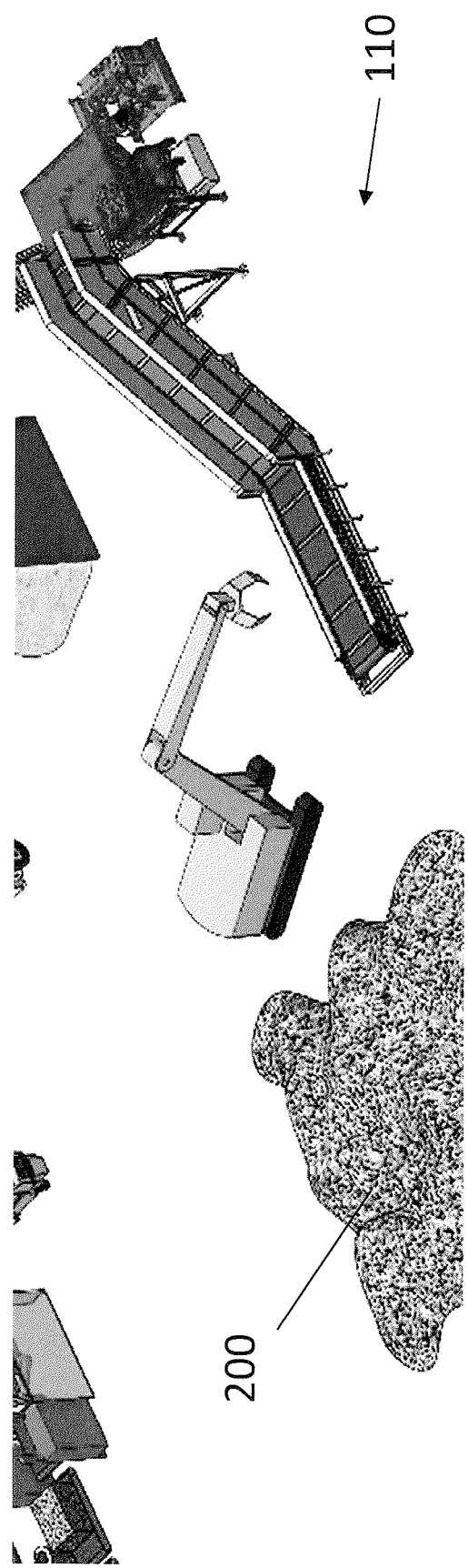
FIG. 2 shows a pictographic representative view of a portion of an example system and method that includes receipt of waste at a material loading area, in accordance with aspects of the present disclosure.

As shown in FIG. 2, the system and method may begin with receipt of waste 200 (e.g., municipal solid waste, or MSW), also interchangeably referred to herein as "feedstock," arriving at the material loading area 110, such as a tipping floor area, similar to a typical transfer station. Delivery of the waste 200 may occur via a payloader and/or grapple operator, for example. The waste may be scanned for hazardous and other unwanted materials and organized (e.g., sorted).

Figure 3:
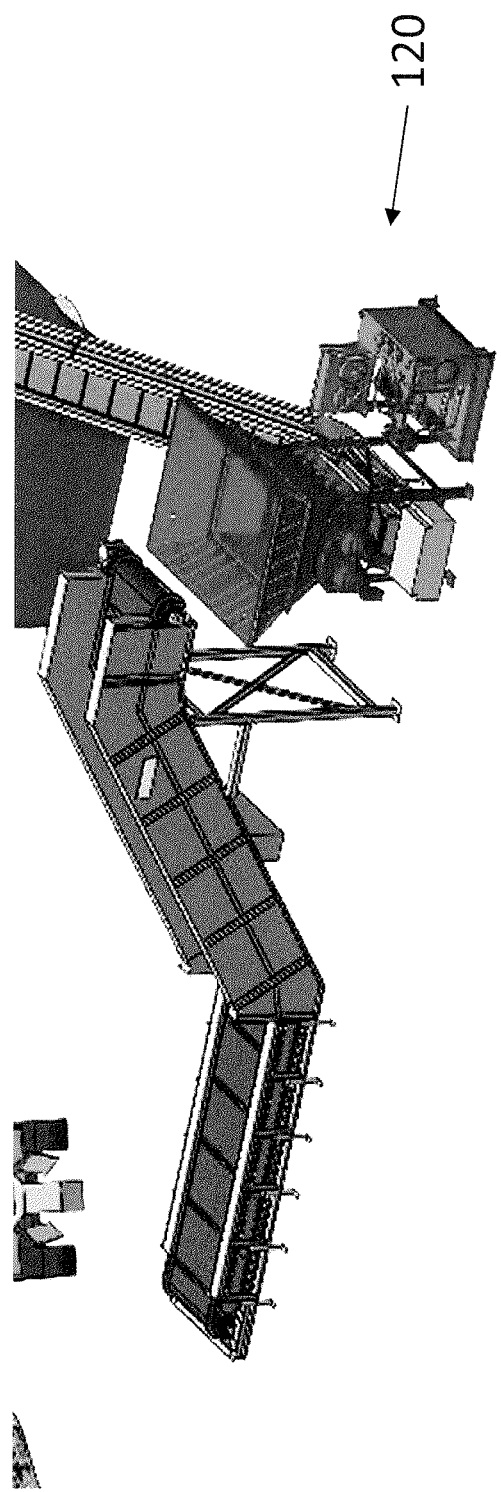
FIG. 3 shows a pictographic representative view of a portion of an example system and method that includes the feedstock being delivered to a shredder, in accordance with aspects of the present disclosure.

The feedstock may then be delivered to the shredder 120, as shown in FIG. 3, which may shred the feedstock into a generally uniform size (e.g., shredded pieces of about six inches in diameter or less). An example shredder 120 may, for example, include a shear-type shredder made by American Pulverizer Company of St. Louis, Mo. Information on an example shredder usable in accordance with aspects of the present disclosure is shown in Attachment A.

Figure 4:
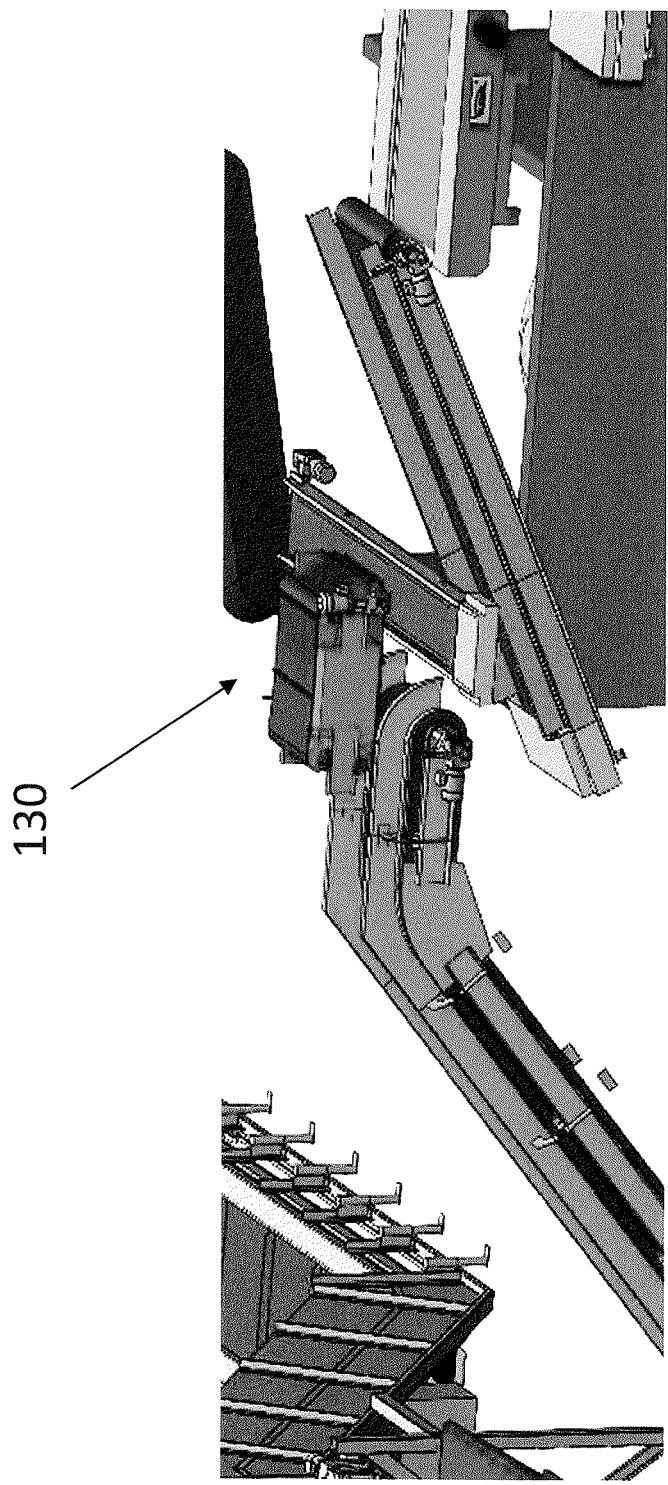
FIG. 4 shows a pictographic representative view of an initial processing portion of an example system and method that includes use of a magnet-based sorting device to assist in sorting magnetic materials from the feedstock, in accordance with aspects of the present disclosure.

The shredded feedstock is then conveyed (e.g., by a conveyer belt or other conveyor mechanism) to an area for further initial processing. An example conveyer may be made by Hustler Conveyor of O'Fallon, Mo. Further information on an example conveyor usable in accordance with aspects of the present disclosure is shown in Attachment B. The initial processing may include, for example, use of the magnet-based sorting device 130, as shown in FIG. 4, to assist in sorting magnetic materials (e.g., ferrous materials) from the feedstock. An example magnet-based sorting device may include drum magnet technology produced by Dings, Co. of Milwaukee, Wis.

Figure 5:
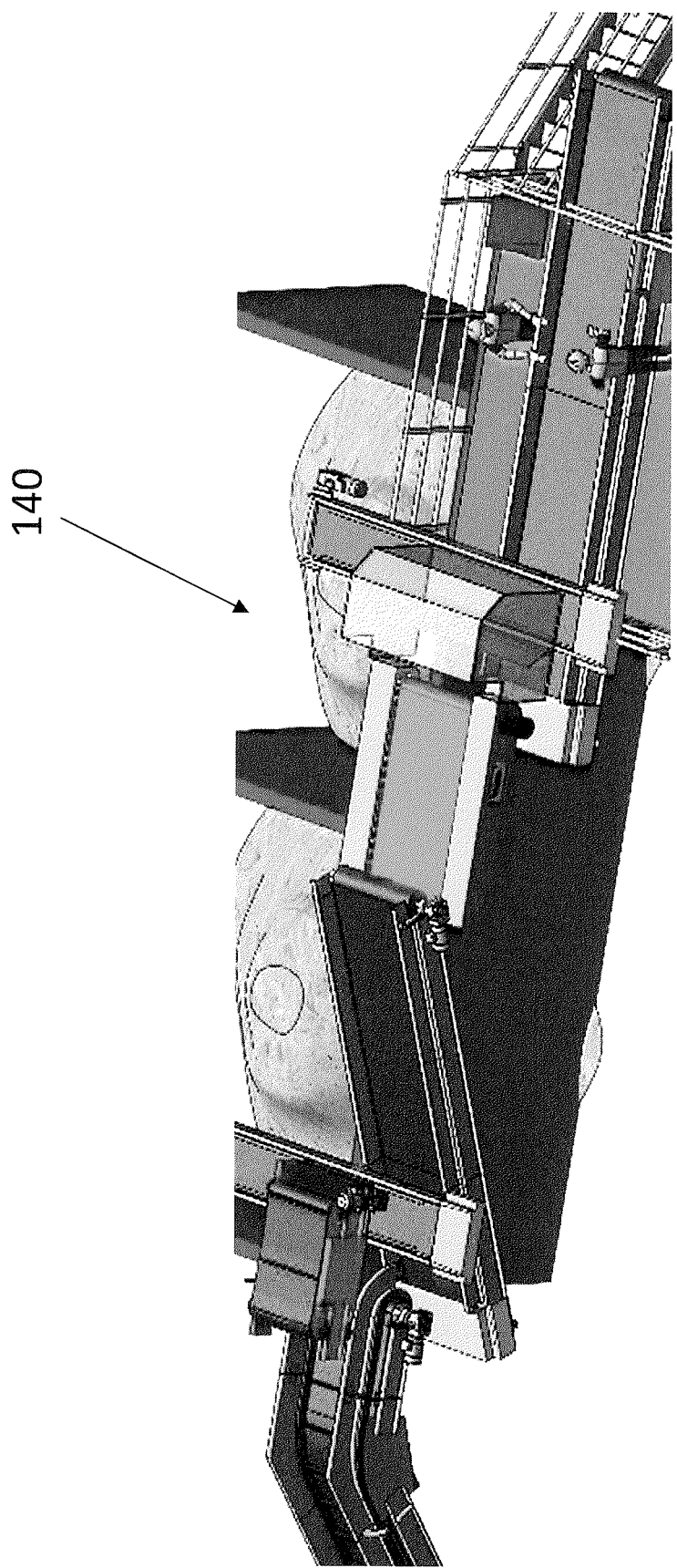
FIG. 5 shows a pictographic representative view of a processing portion of an example system and method that includes use of an eddy current type sorting device to separate non-ferrous metals from the feedstock, in accordance with aspects of the present disclosure.

Additional initial processing may include, for example, use of the eddy current type sorting device 140, as shown in FIG. 5, to separate non-ferrous metals from the feedstock. An example eddy current type sorting device may include an eccentric rotor eddy current separator made by Dings, Co. of Milwaukee, Wis. Further information on example eddy current devices usable in accordance with aspects of the present disclosure are shown and described in Attachment C.

Figure 6:
FIG. 6 shows a pictographic representative view of a processing portion of an example system and method that includes one or more sorting areas, such as one or more quality sort platforms, in accordance with aspects of the present disclosure.

Also included in the process may be the one or more sorting areas 150, such as one or more quality sort platforms, as shown in FIG. 6. Further initial processing may include use of a ballistic separator to separate, for example, two dimensional material from three dimensional material, as well as various fines from the feedstock. The fines may be separated, for example, using a screen or other fine separator. Such fines may proceed to the drying process at this time, as described further below.

The feeds of separated two dimensional and three dimensional material may then be deflected to an optical sorter where, for example through the use of software based devices high value plastics (e.g., number one and number two plastics) may be identified and separated from the feeds. These plastics may be baled, sorted and sold to recycling companies, along with the separated ferrous and non-ferrous metals. In addition to separating the plastics from the feeds, any polyvinyl chloride (PVC) containing materials may also be separated. In one example implementation, a goal of 0.5 percent of PVC is sufficient. Various aspects of an example optical sorter usable in accordance with aspects of the present disclosure are shown and described in Attachment D.

Figure 7:
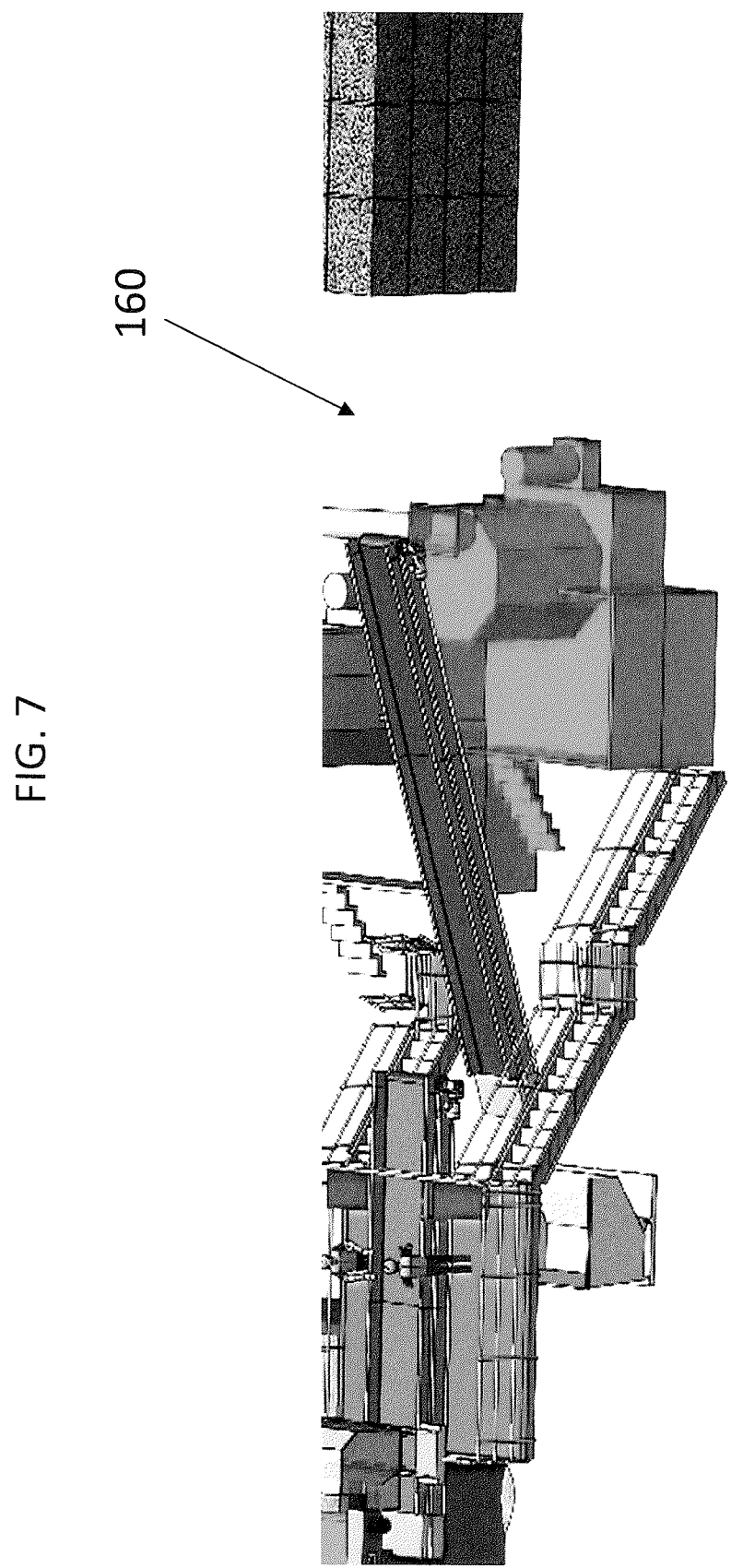
FIG. 7 shows a pictographic representative view of a processing portion of an example system and method that includes a first dryer and pulverizer, which may include or further include one or more VSIs, in accordance with aspects of the present disclosure.
Figure 9:
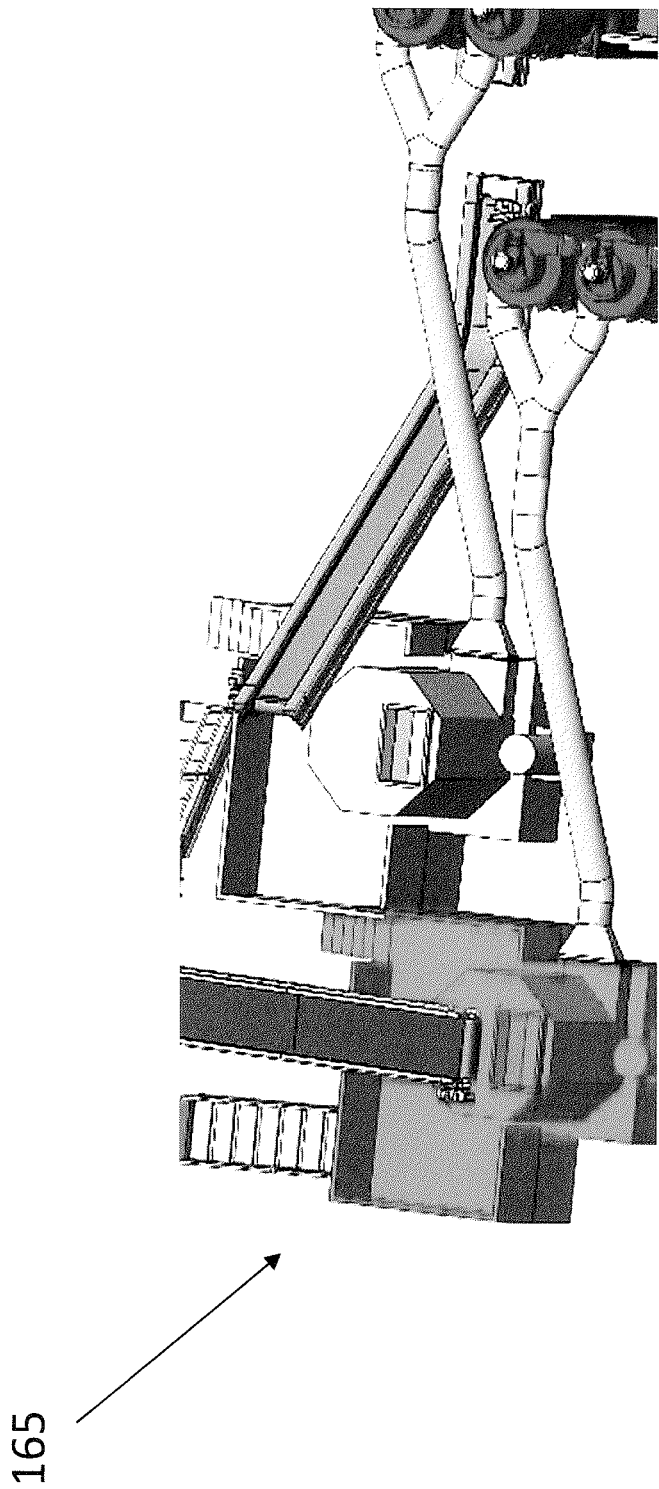
FIG. 9 shows a pictographic representative view of a processing portion of an example system and method that includes a second dryer and pulverizer, which may include or further include one or more VSIs, in accordance with aspects of the present disclosure.

The remaining materials in the feed may then proceed to a drying and pulverizing phase. Such drying and pulverizing may occur via mechanical processing, such using a first dryer and VSI (e.g., dryer and pulverizer 160 of FIG. 7) of one or more dryers and crusher/separator 160, 165 as shown in FIGS. 7 and 9. An example pulverizer may include a VSI, such as a VSI made by Sebright of Hopkins, Mich. Additional information regarding an example VSI usable in accordance with aspects of the present disclosure is shown and described in Attachment E. The VSI may include, for example, a hammer mill type feature in a horizontal arrangement relative to the feed direction. The hammer mill may include use of blunt metal blades, for example. Among other results of the VSI operation, for any type of material having a closed cell type structure, the VSI ruptures the cell structure. The VSI may pulverize the feed and produce an air flow from its operation. In one example implementation the VSI may produce about 18,000 cfm of air flow.

Figure 8:
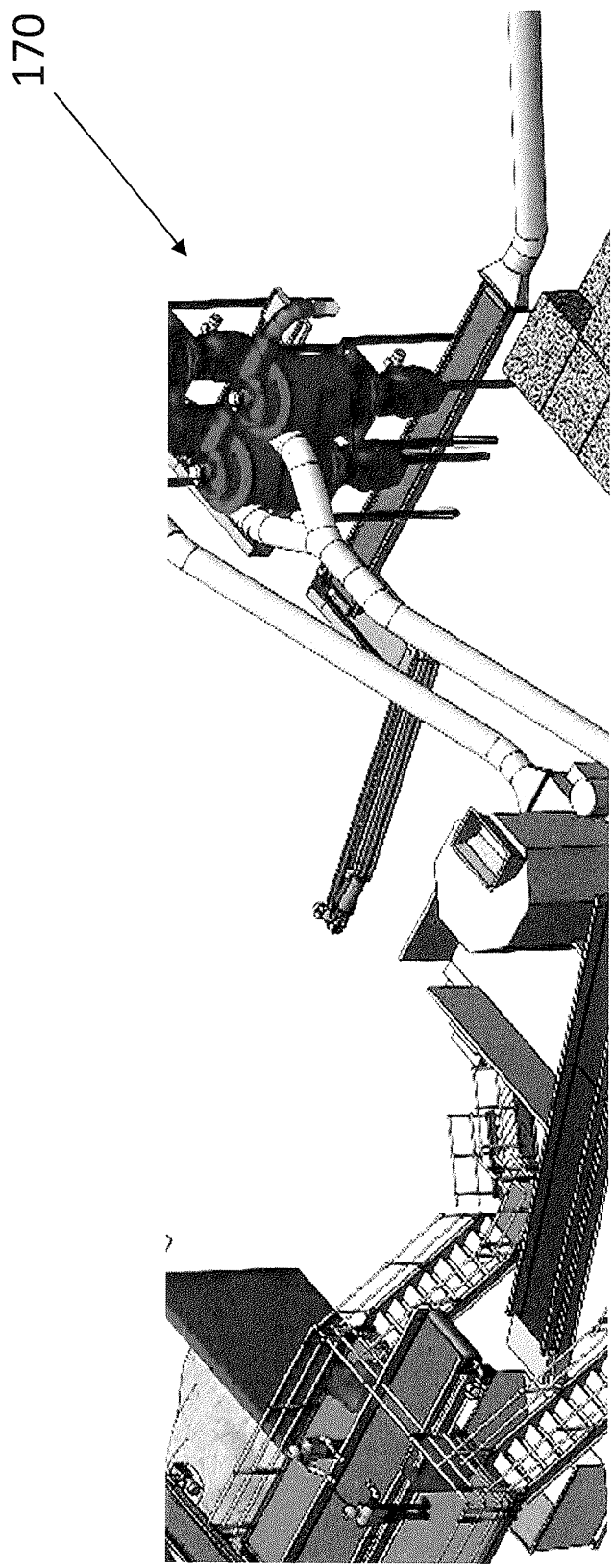
FIG. 8 shows a pictographic representative view of a processing portion of an example system and method that includes a first moisture separation device, in accordance with aspects of the present disclosure.
Figure 10:
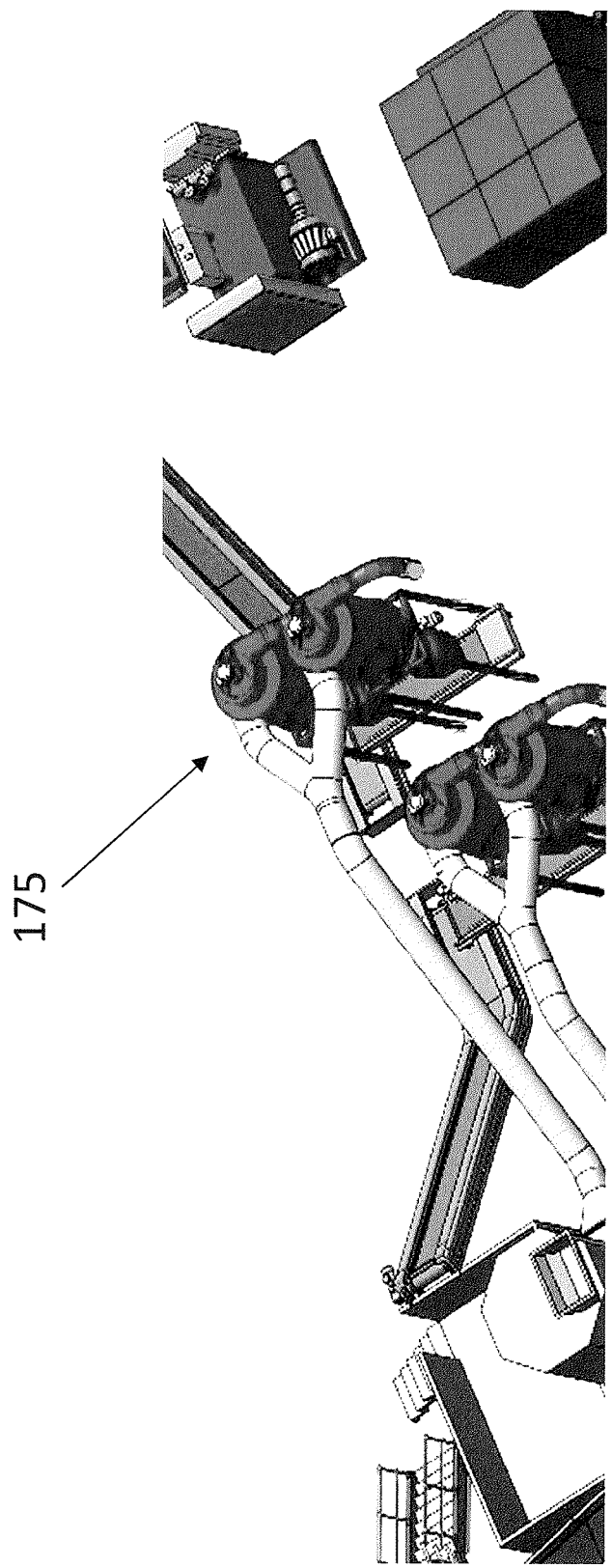
FIG. 10 shows a pictographic representative view of a processing portion of an example system and method that includes a second moisture separation device, in accordance with aspects of the present disclosure.

From the drying and pulverizing process, the feed may then proceed to a first moisture separation device (e.g., device 170 of FIG. 8) of one or more moisture separation devices 170, 175, as shown in FIGS. 8 and 10, such as cyclones. Various example cyclone components usable in accordance with aspects of the present disclosure may be made by Imperial Systems, Inc., of Jackson Center, Pa. Information regarding example an example cyclone usable in accordance with aspects of the present disclosure is shown and described in Attachment F. The cyclones, in one example implementation, may produce about 30,000-50,000 cfm of air flow. The cyclone air flow may shear water and other liquid from the feedstock. waste 200. One byproduct may include water generation from the feed, which may be recovered for further use. In one example implementation, the system recaptures water at the rate of 4500 liters per hour. The produced fugitive air flow may proceed to a baghouse for fines removal, and any heavier material in the airflow may collect below the airflow.

The feed of the feedstock may then proceed to a second dryer and pulverizer (e.g., dryer and pulverizer 165 of FIG. 9) for a second drying and final sizing process, followed by a second processing past cyclones (e.g., a second moisture separation device 175 of FIG. 10) to remove any leftover moisture in the feed. Fines may again be collected from the air flow at a baghouse. The leftover moisture may also be reclaimed as water after the air flow passes the baghouse.

Figure 11:
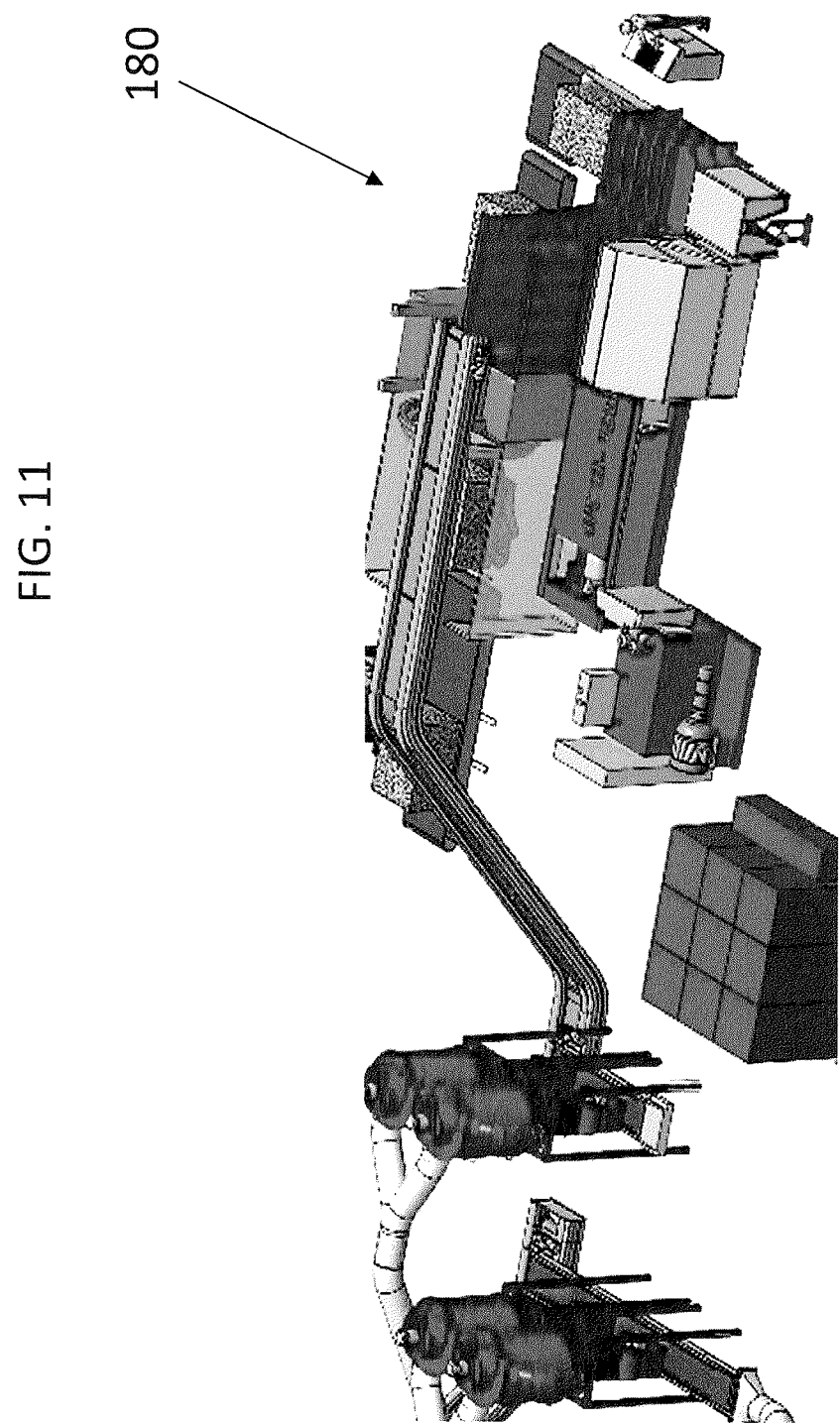
FIG. 11 shows a pictographic representative view of a processing portion of an example system and method that includes an example baler, in accordance with aspects of the present disclosure.
Figure 12:
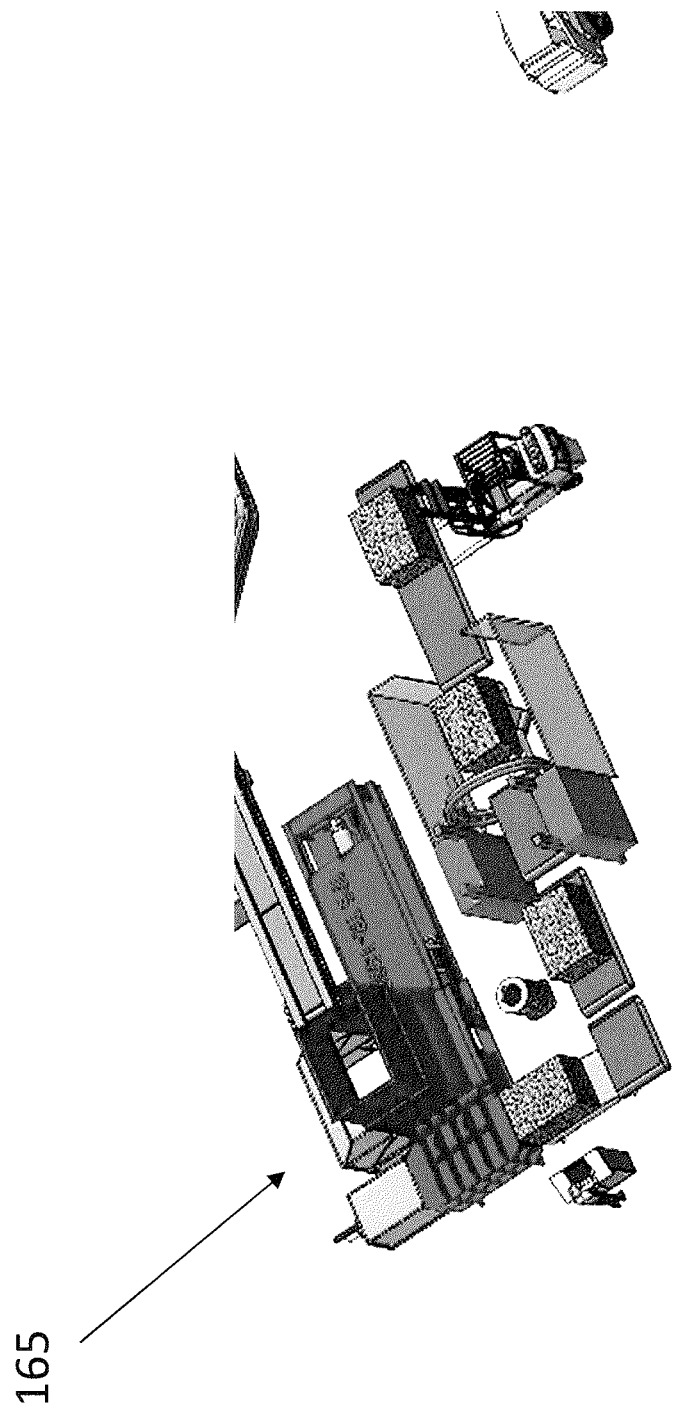
FIG. 12 shows a pictographic representative view of a processing portion of an example system and method that includes an example packager, in accordance with aspects of the present disclosure.

At this point in the processing, the feedstock waste 200 may now constitutes dried MSW, which has the constituency of fluff. The fluff feedstock may then optionally be baled (e.g., using example baler 180 as shown in FIG. 11) and cross-wrapped (e.g., using packager 190 as shown in FIG. 12) for use, for example, as fuel having higher British Thermal Unit (BTUs) per unit weight than standard MSW waste that has not been processed in accordance with the above described portions and a system and method in accordance with aspects of the present disclosure. An example baler usable in accordance with aspects of the present disclosure may be made by Maren Balers & Shredders of South Holland, Ill. Information on an example such baler usable in accordance with aspects of the present disclosure is shown and described in Attachment G.

Alternatively to being baled and cross-wrapped for shipping and/or later use, the fluff consistency feedstock may be further processed. In one example implementation, the fluff feedstock next proceeds to a thermal screw technology, for example as may be made by Therma-Flite of Benicia, Calif. Information relating example such thermal screw is technology usable in accordance with aspects of the present disclosure is shown and described in Attachment H. With thermal screw technology, the fluff feedstock begins to pyrolize. As a result of the thermal screw process, the feedstock undergoes a physical change and also a chemical change (into carbon). One advantage of use of thermal screw technology for this processing is that the system avoids the need for addition of heat to the feedstock for pyrolization to occur.

During the pyrolization process, the material may produce various output products, such volatiles (e.g., tars and volatile gases), bio-oils, and water. Many of the volatile gases, tars, and oils may be captured, for later sale (e.g., for further refining by refineries). Some of the output gases may be scrubbed into high quality gases that may be used with production of synthetic natural gas.

Another output resulting from the pyrolized fluff feedstock is bio-char. Some bio-char may be used, for example, in the development of soil amendment products. Proper bio-char for this purpose may need to be pyrolized at a specific temperature, and the pH of the material may need to be controlled, among other factors. Aspects of the present disclosure relating to pyrolization equipment and control and monitoring thereof (including measurement and control of temperature, pH, and other factors relevant to producing bio-char usable for these purposes) may include software and monitoring and control systems.

In addition to controlling the resulting bio-char for use in soil amendment products, in one example implementation, fish hydrolysate or other suitable material may be added to the bio-char to enhance is usefulness for agricultural purposes. Bio-char with such additive may, for example, increase water and nutrient efficiencies in soil to which it is added and increase soil tilth.

The water output from the pyrolization process (as well as that produced by the drying/pulverizing) may be significant and may also produce a useful product. It is noted that typical MSW averages about 43% water content. As moisture laden air exits the baghouse during processing by the pulverizer/dryer, water vapor in the air may be condensed into a water output stream. In one example implementation in accordance with aspects of the present disclosure, approximately 1200 gallons of water may be recaptured from processing about fourteen tons per hour of MSW. Such water output from municipal waste may be particularly valuable for processing in arid locations, where, for example, the water plus the bio-char soil amendment output may be used in large scale agricultural reclamation projects (e.g., reclaiming desert for agricultural uses).

As an alternative to bio-char for agricultural uses, in one example implementation, the bio-char may be shipped (e.g., by train) for use as bio-coal. In this process, the bio-char may, for example, be processed by reintroduction of certain gases and tars, for example, and forming the bio-char into briquettes of suitable size and consistency for use by utility companies. For example, the briquettes may be between about ⅜ of an inch to about ¾ of an inch in diameter.

Figure 13:
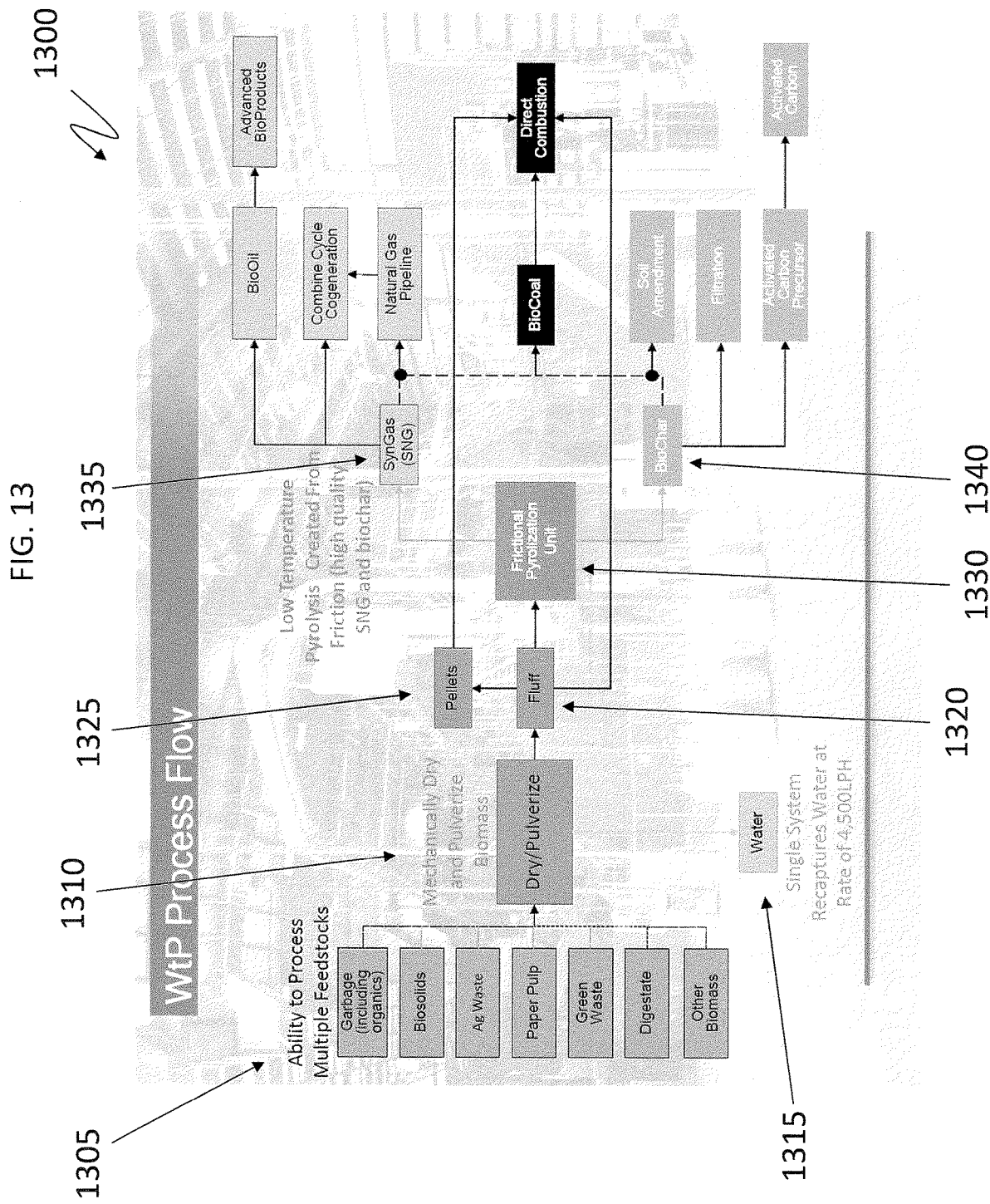
FIG. 13 contains a representative flow chart of various example components and/or functions of a system in accordance with aspects of the present disclosure.

FIG. 13 contains a representative flow chart of various example components and/or functions of a system in accordance with aspects of the present disclosure. As shown in FIG. 13, the flow 1300 may include processing of one or more feedstocks 1305 that may include, for example, garbage (including organics), biosolids, agricultural waste, paper pulp, green waste, digestate, and/or other biomass, as well as other materials. The feedstocks may be dried and otherwise processed 1310, such as by pulverizing, which, among other things, may result in production of water 1315 from the drying and other processing 1310.

Output of the feedstock from drying and other processing 1310 may include production of a fluff 1320, which may in turn be used to produce pellets 1325 or other output 1335 (e.g., syngas), via additional processing, such as pyrolysis 1330.

The pyrolization process 1330 may also be used, for example, to produce biochar 1340. The syngas process 1335 and/or biochar process 1330, for example, may in turn be used in production of biocoal, biooil, advanced bioproducts, synthetic natural gas, combine cycle generation, soil amendment products, filtration products, activate carbon precursors and activated carbon products.

Figure 13A:
FIG. 13A shows a high level representative pictographic diagram of the MSW to fluff to clean coal product, in accordance with aspects of the present disclosure.

FIG. 13A shows a high level representative pictographic diagram of the MSW to fluff to clean coal (e.g., biocoal) product, in accordance with aspects of the present disclosure.

Figure 13B:
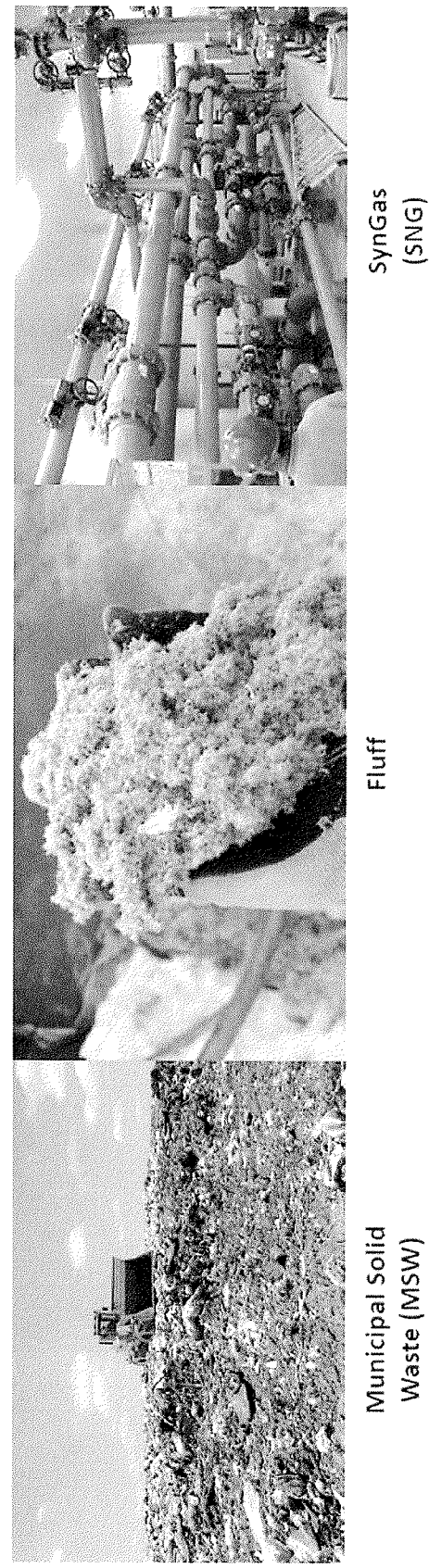
FIG. 13B shows a high level representative pictographic diagram of the MSW to fluff to syngas product, in accordance with aspects of the present disclosure.

FIG. 13B shows a high level representative pictographic diagram of the MSW to fluff to syngas product, in accordance with aspects of the present disclosure.

Figure 14:
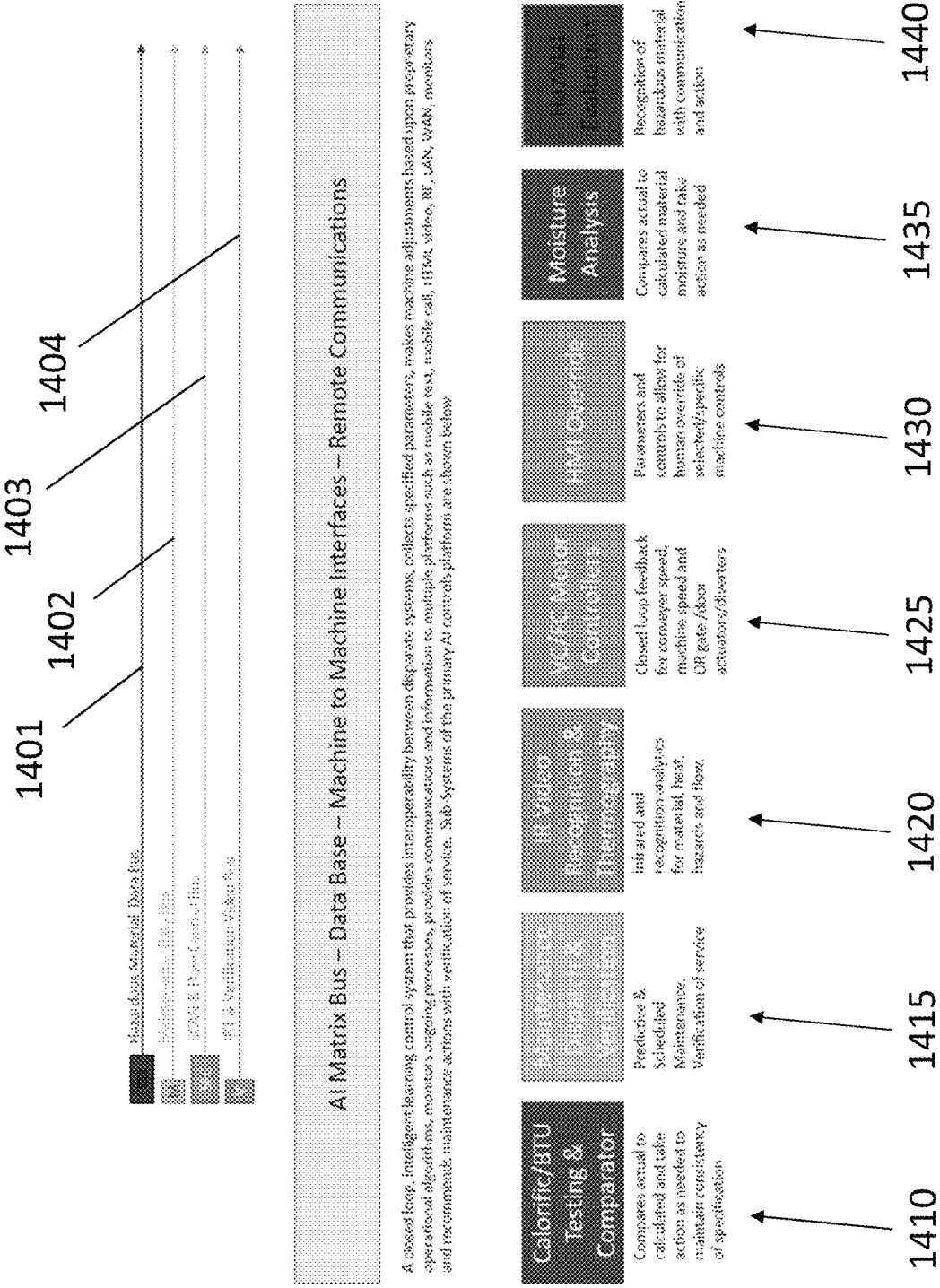
FIG. 14 show various devices and processes within an example control system, in accordance with aspects of the present disclosure.

Aspects of the present disclosure may include a control system for managing and/or controlling the monitoring, operation, and/or interoperation of the various processing devices within an overall MSW processing system, such as described above. Such control system may include various aspects and features as representatively shown in FIGS. 14-17. In FIG. 14, a matrix bus and various devices and processes connectable via machine to machine interfaces are shown for receiving parameters, providing mechanisms/algorithms for adjusting parameters, otherwise providing monitoring, and providing and controlling communications to, from, and among the devices of the system. Among other things, control via such matrix bus may allow the control system to recognize data from the devices and processes, control overall operation of the system, determine whether each device/process is functioning properly, control operation of each device/process (e.g., speed up or slow down each device/process), input changes to operational parameters and/or other characteristics of operation, schedule and monitor maintenance and other routine operations, use video and IR thermography for various analytics for the system, monitor and control various electrically operated features, such as conveyors, gates, doors, and other electrically driven system components, enable override of various subsystem components, analyze moisture in the feedstock and other aspects of the processing, and assess the presence of and assist in monitoring and controlling hazardous materials.

As shown in FIG. 14, in the devices and processes within the control system may include, for example, a calorific/BTU testing and comparator function 1410, maintenance dispatch and verification function 1415, infrared (IR) video recognition and thermography function 1420, voltage control (VC)/frequency control (FC) motor controllers function 1425, human-machine interface (HMI) override function 1430, moisture analysis function 1435, and hazmat evaluation function 1440. Each of the above devices and processes may have its own control operations (e.g., for stand-alone control via an HMI console), for stand-alone operation, and also has one or more communications ports and/or communication interface features (e.g., an Ethernet connection for providing input/output communication with the device/process). However, the above devices and processes generally do not have the capability on their own to interoperate with one another. Thus, for example, to control overall operation in the absence of such interoperability, each device and/or process must be individually controlled so as to produce an overall system output.

As further shown in FIG. 14, in one example implementation, the bus may include several communication buses (also interchangeably referred to herein as "communication pathways" or "communication highways"), which may, for example, provide for communication regarding hazardous material data 1401, maintenance data 1402, scanning machine/process operation and flow control 1403, and IR thermography (IRT) and verification data 1404, such as video. The hazardous material data bus 1401 may provide information communications regarding the presence/handling of hazardous materials. For example, human video monitoring and/or automated video analysis may be used to identify the possible presence of hazardous material in the feedstock. The maintenance data bus 1402 may be used to communicate maintenance information, such as a maintenance activity for a particular machine being due. The scanning machine/process operation and flow control bus 1403 may provide a communication pathway for information regarding machine operation, for example. The IRT and verification video bus 1404 may, for example, provide video feed, such as video for monitoring a service technician's scheduled servicing of a machine. Such video may include, for example, either an existing machine/process monitoring video feed or a separately installed video monitoring device to the existing machine/process. In one example implementation, triggering of the video recordation for such a maintenance feed may occur, for example, by signaling via initiation of the maintenance operation (e.g., service technician signals maintenance operation begins, or maintenance operation is detected by technician activity).

As shown in FIG. 14, for the calorific/BTU testing and comparator function 1410, samples of processed feedstock may be taken, for example, at various points in the processing of the feedstock, to measure characteristics of the feedstock and consistency with processing expectations. For some machines/processes, such characteristics may be determinable via the standalone machine/process, and the comparator function 1410 may additionally serve as a check of that machine's/process' determination of the characteristic.

For the maintenance dispatch and verification function 1415, information on maintenance requirements may be stored and used to trigger maintenance functions and to verify proper completion. Additional features may include monitoring features, such as use of cameras to check machine operations or characteristics (e.g., IR cameras identifying excessive heat generation from machine parts that are in process of predicted failure).

For the IR video recognition and thermography function 1420, video and IR cameras are used to monitor various activities, machines, etc., to ensure proper operation/predict failure. Some aspects of the IR video recognition and thermography function 1420 may overlap with those in the maintenance dispatch and verification 1415.

For the voltage control (VC)/frequency control (FC) motor controller function 1425, various aspects of electrical operation may be monitored and controlled, such as to control machine operation and conveyor speed, opening and closing of gates, valves, and doors, and operation of various other devices, such as actuators and diverters.

For the HMI override function 1430, the control system and/or an operator may be provided with the capability to override the operations normally controlled via the HMI, for example.

For the moisture analysis function 1435, actual moisture levels may be collected (e.g., via sensors) and used for comparison to calculated/predicted moisture levels as may be important for product output quality control. For example, length of time for machine/process operation may be varied to control moisture at various points in the overall system operation. Sensed results may also require input of moisture to the feedstock if insufficient moisture is present.

For the HazMat evaluation function 1440, various sensors may be used to identify the presence of hazardous materials and to communicate and/or control response thereto. Such sensors may include, for example, video and/or IR cameras, chemical sensors, and radiation sensors.

Figure 15:
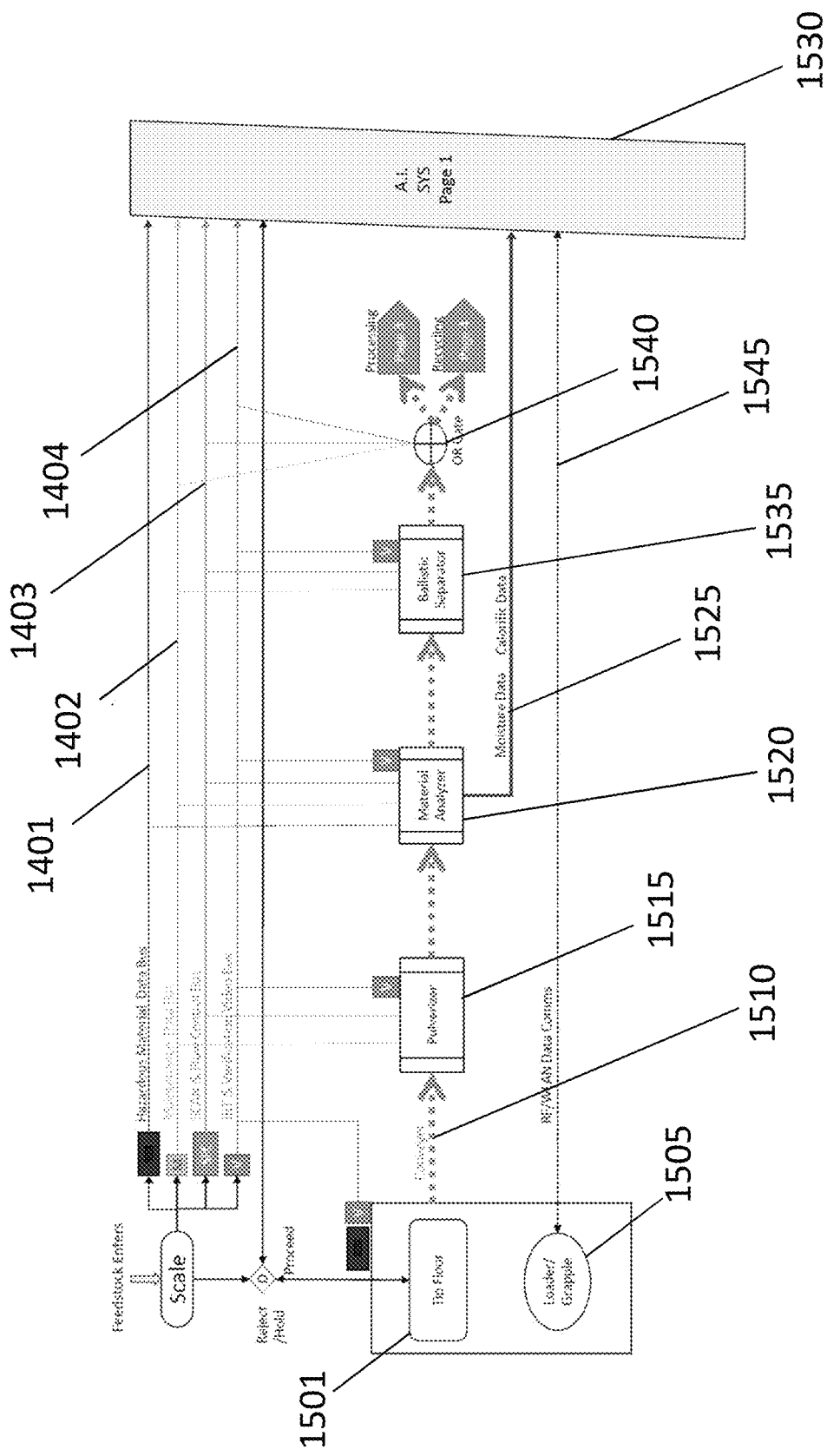
FIG. 15 shows a representative diagram of various components/subsystems and their various interactive operation for processing feedstock via the matrix bus of FIG. 14.

FIG. 15 shows a representative diagram of a first portion of various components/subsystems for a system and method for processing waste, as well as interactive operation of such components/subsystems, via the matrix bus of FIG. 14. As shown in representative fashion in FIG. 15, waste may enter the system at the tip floor 1501. At the tip floor 1501, communications and other functions regarding initial analyzing of the waste may occur via an IRT and verification video bus 1404, which may communicate a feed, for example, with one or more video and/or other inputs at this location, as well as the hazardous material data bus 1401. The waste may then be loaded/grappled 1505 to a conveyor system 1510 where it may proceed to a pulverizer 1515. After conveyance from the tip floor 1501 to the pulverizer 1515, the IRT and verification video bus 1404 may provide communications and other functions via one or more feeds with a video and/or other input at this location, for example. Communications and other functions may also occur between the pulverizer 1515 location and the maintenance data bus 1402 and the scan and flow control bus 1403.

The feedstock in FIG. 15 may then proceed to the material analyzer 1520, where communications and other functions may occur via all four bus lines 1401, 1402, 1403, 1404 (via the same or similar couplings as for the pulverizer 1515, as well as for hazardous material data). Communications and/or other functions relating to moisture and calorific data 1525 with respect to the material analyzer 1520 may also occur via coupling(s) with the system control module 1530.

The feedstock may then proceed to the ballistic separator 1535, for which, similar to the pulverizer area 1515, the IRT and verification video bus 1404 may provide communications and other functions feed with, for example, a video and/or other input, as well as with the maintenance data bus 1402 and the scan and flow control bus 1403.

Figure 16:
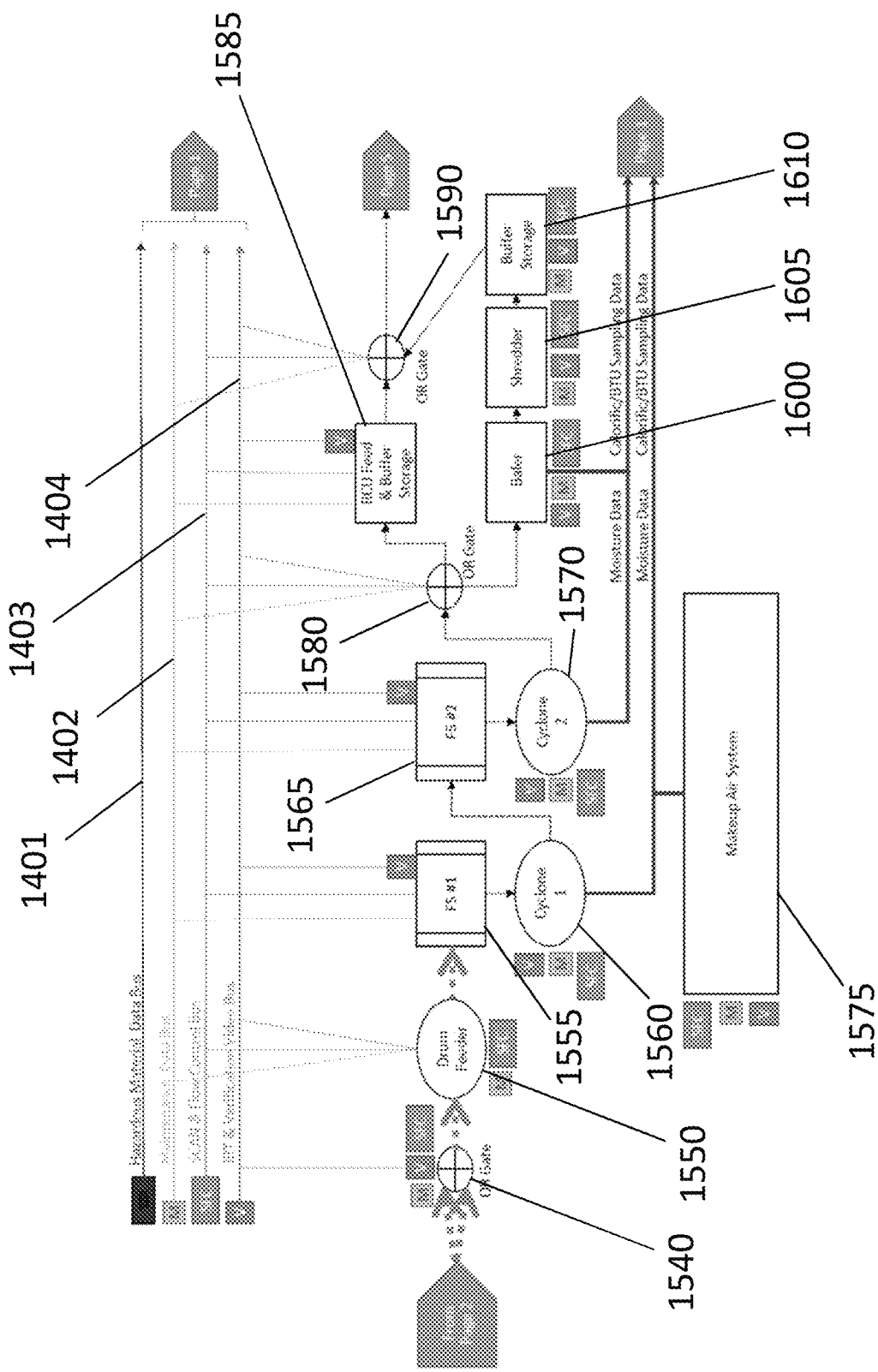
FIG. 16 shows additional components/subsystems for further processing feedstock in accordance with the representative diagram of FIG. 15.
Figure 17:
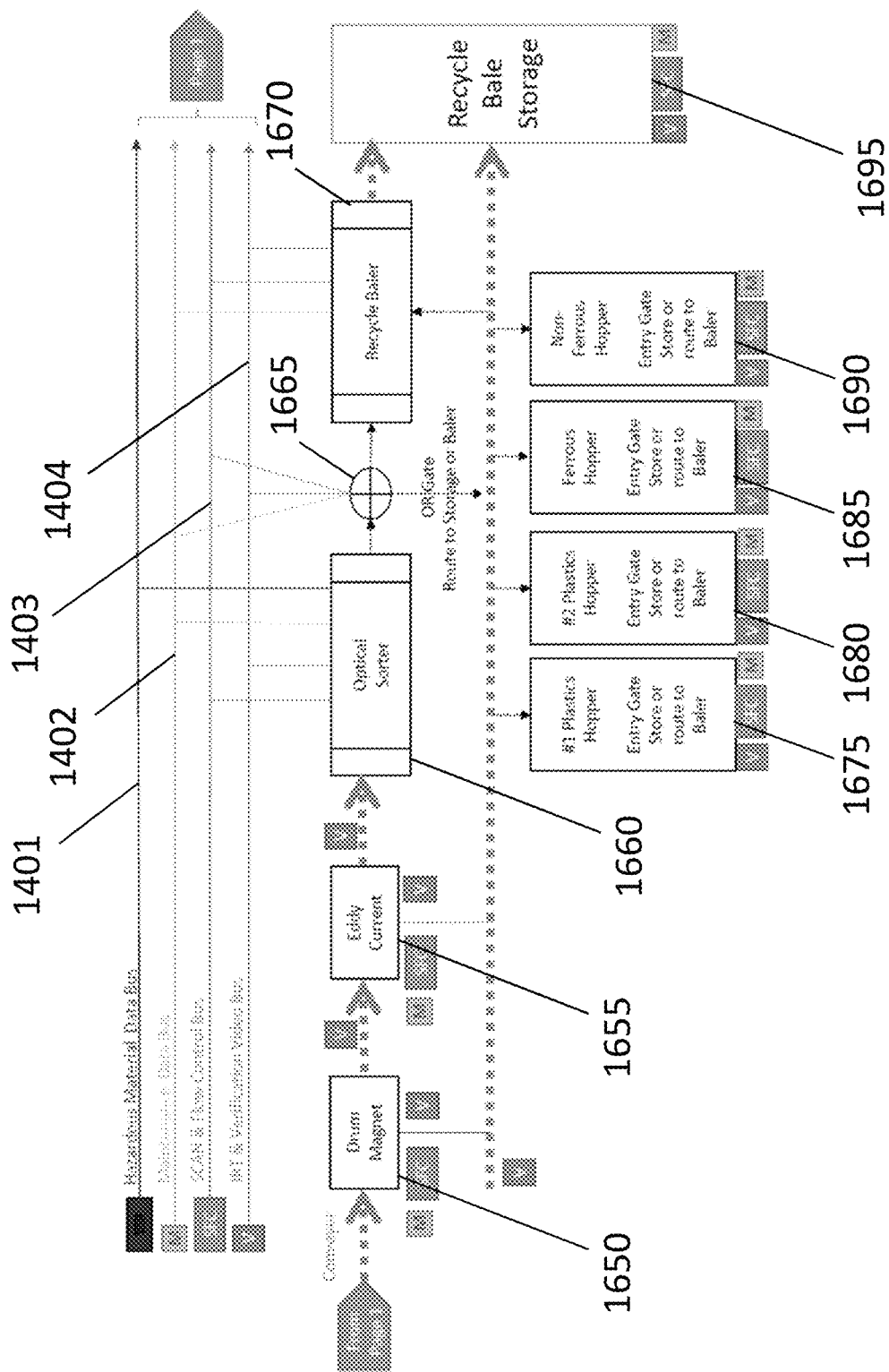
FIG. 17 shows additional components/subsystems for further recycling feedstock in accordance with the representative diagram of FIG. 15.

As further shown in FIG. 15, processing may then proceed to one of further processing (to FIG. 16) or recycling (FIG. 17). For example, the conveyor 1510 may include multiple separate flows of feedstock, the flows relating to materials separated based on content. Decisional communications and other functions relating to the feedstock processing for the next action 1540 (e.g., a decision function as to which next step in processing is to be carried out), similar to as for the pulverizer 1515 and ballistic separator 1535, may include couplings with the IRT and verification video bus 1404, as well as with the maintenance data bus 1402 and the scan and flow control bus 1403.

As shown in FIG. 15, communications and other functions 1545 may also occur between the system control module 1530 and the loader/grapple 1505. For example, the system control module 1530 may provide communications and/or control as to the rate of loading to the conveyor 1510.

FIG. 16 shows a continuation of the processing flow of FIG. 15 from decision point 1540 for further processing of the feedstock for energy based and other use, such as in the form of baled fluff or pellets. A drum feeder 1530, such as shown and described in Attachment B, may deliver the feedstock to a first mechanical pulverizer 1555, such as a VSI, which, after processing and/or as part of processing, may include use of a dryer 1560, such as a cyclone. Some or all of the feedstock may then proceed to a second mechanical pulverizer 1565 and/or a second dryer 1570. As further shown in FIG. 16, a feed of makeup air, such as air generated from a makeup air system 1575, may provide a source of air for use by dryers 1560, 1570. Each of the drum feeder 1550, the pulverizers 1555, 1565, the dryers 1560, 1570, and the makeup air system 1575 may be coupled to the maintenance data bus 1402, the scan and flow control bus 1403, and the IRT and verification video bus 1404.

Figure 18:
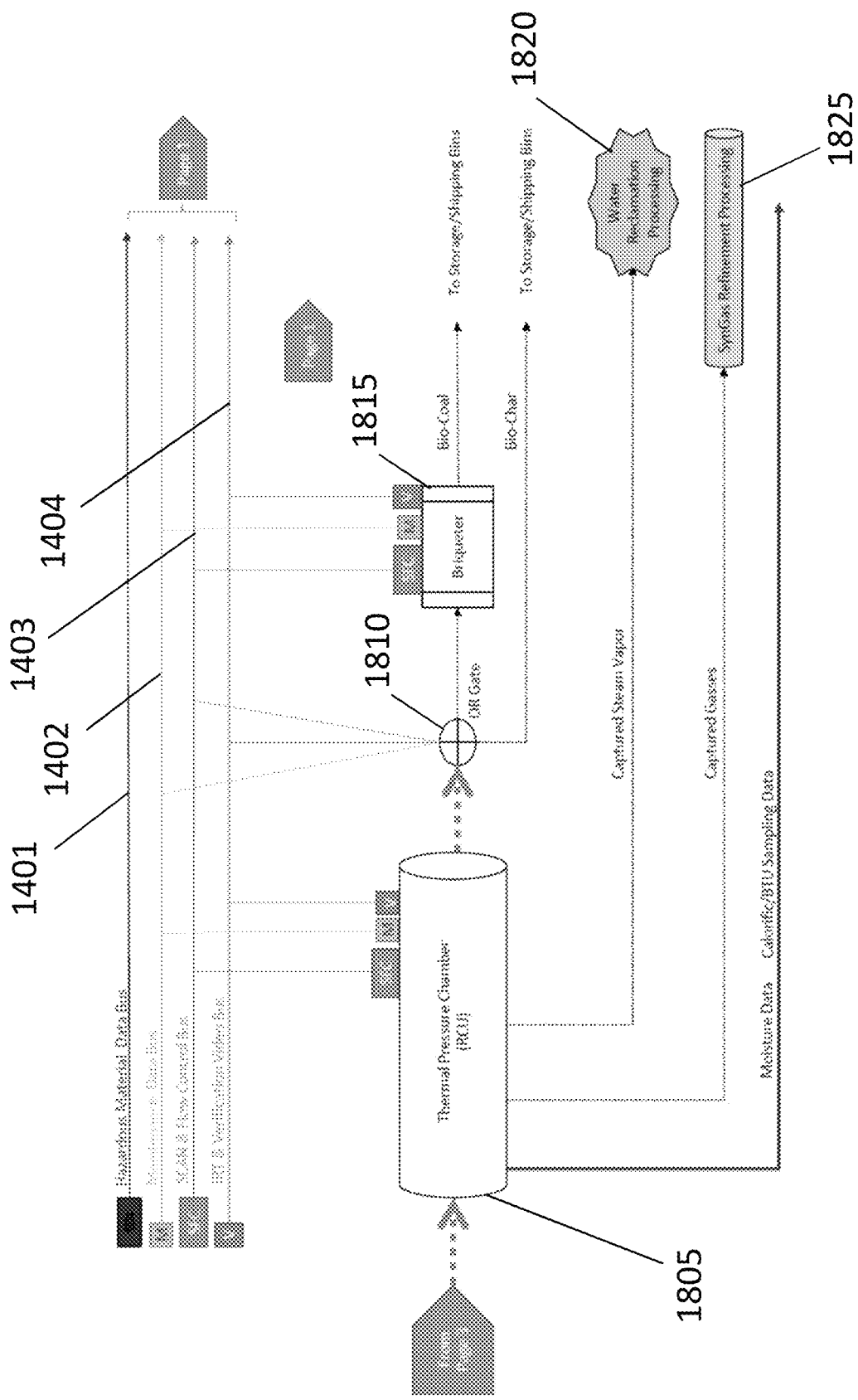
FIG. 18 shows additional components/subsystems for further product processing, in accordance with the representative diagram of FIG. 15.

Output feedstock after processing by the mechanical pulverizers 1555, 1565 and dryers 1560, 1570 may proceed to a next decision point 1580 for feedstock processing for the next processing activity. Such next processing activity may be or include, for example, processing by a thermal screw feed and buffer storage device 1585. This device 1585 may, for example, via decision point 1590 buffer and selectively feed the feedstock to further processing, such as via a thermal screw technology for compressible processing of the feedstock into pellets, as shown in FIG. 18. An example thermal screw technology usable (or usable with modification) in accordance with aspects of the present disclosure includes thermal screw technology made by Therma-Flite of Benicia, Calif. Each of the decision point 1580, the thermal screw feed, the buffer storage device 1585, and the decision point 1590 may be coupled to the maintenance data bus 1402, the scan and flow control bus 1403, and the IRT and verification video bus 1404.

In FIG. 16, alternatively to proceeding to the thermal screw feed and buffer storage device 1585, the decision point 1580 may direct the feedstock to a baler 1600, shredder 1605, and buffer storage 1610. From the buffer storage, similar to as for output from the thermal screw feed and buffer storage device 1585, the decision point 1590 may selectively feed feedstock to the further processing shown in FIG. 18. Each of the baler 1600, the shredder 1605, and the buffer storage 1610 may be coupled to the maintenance data bus 1402, the scan and flow control bus 1403, and the IRT and verification video bus 1404.

FIG. 17 shows a continuation of the processing flow of FIG. 15 from decision point 1540 for further processing of the separations delivery for recycling and/or storage in baled form. As shown in FIG. 17, the feedstock may first proceed to a magnetic separator 1650, such as drum magnet technology, to separate magnetic materials from the feedstock, and the separated magnetic material may selectively be redirected to a ferrous hopper 1685, for example. From the magnetic separator 1650, the remaining feedstock may proceed to a non-magnetic metal separator 1655, such as an eddy current generator to separate non-ferrous metals, for example, from the feedstock, and the separated non-magnetic material may selectively be redirected to a non-ferrous hopper 1690, for example.

From the non-magnetic metal separator 1655, the remaining feedstock may proceed to an optical sorter 1660 to sort optical material from the feedstock. The optical sorter 1660 may use, for example, air knife technology to separate identified materials, such as certain plastics, and separate those materials from the feedstock. From the optical sorter, feedstock may proceed to a decision point 1665, from which material flow may be directed either to the hoppers 1675, 1680, 1685, 1690, as appropriate, or continue on to a recycling baler 1670. Any remaining separated plastics, ferrous metals, and non-ferrous material may be routed to respective hoppers 1675, 1680, 1685, 1690 for storage or later routing to balers (e.g., baler 1670), for example, for sale, transfer, or further processing. The recycling baler 1670 may also selectively receive materials from one or more of the hoppers 1675, 1680, 1685, 1690. The materials from the baler 1670 and the respective hoppers 1675, 1680, 1685, and 1690 may also proceed to recycle bale storage 1695. Each of the magnetic separator 1650, the non-magnetic separator 1655, and the optical sorter 1660, as well as each of the plastic hoppers 1675, 1680, the ferrous hopper 1685, and the non-ferrous hopper 1690 may be coupled to the maintenance data bus 1402, the scan and flow control bus 1403, and the IRT and verification video bus 1404.

FIG. 18 shows additional components/subsystems for further product processing, in accordance with the representative diagram of FIG. 16, from decision point 1590 (FIG. 16). As shown in FIG. 18, the feedstock may proceed to a thermal screw processing 1805, for example, for use in further production of syngas and other related products and/or biochar and related products, as further shown and described with respect to FIG. 13 above. From the processing of the feedstock at the thermal screw processing 1805, moisture, may be expelled, along with captured steam vapor, which may be used for water reclamation processing 1820, and gases may be captures, such for use in syngas refinement processing. From the thermal screw, the further processed feedstock may proceed to a decision point 1820, from which the feedstock may selectively proceed to storage/shipping bins or on to a briquetter 1815, which may be used, for example, for production of bio-coal. Each of the thermal screw 1805, the decision point 1810, and the briquetter 1815 may be coupled to the maintenance data bus 1402, the scan and flow control bus 1403, and the IRT and verification video bus 1404.

Figure 19:
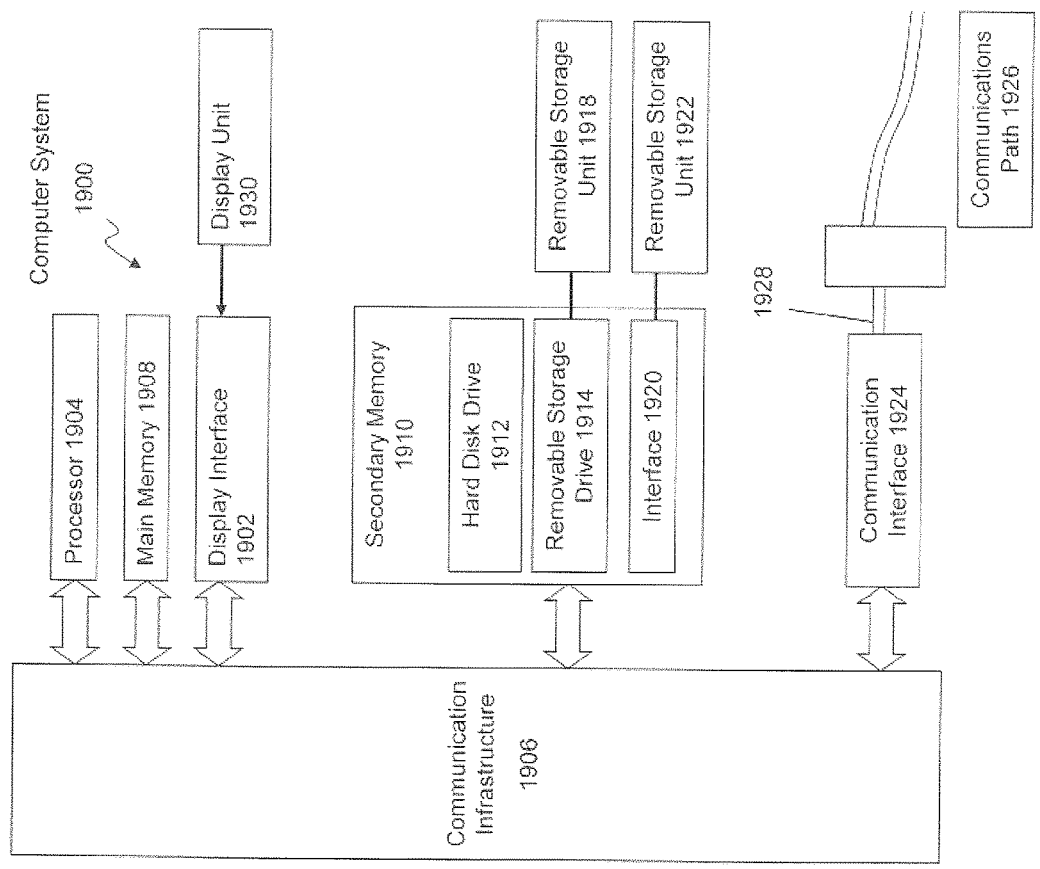
FIG. 19 contains a representative diagram of example computer system components capable of carrying out various functionality described in example implementations of a control system and other processes in accordance with aspects of the present disclosure.

Per above, aspects of the systems, devices, and methods of the present disclosure may include a control system for managing and/or controlling the monitoring, operation, and/or interoperation of the various processing devices within a processing system, as well as overall operation of the system, which may be implemented using hardware, software or a combination thereof and may be implemented in one or more computer systems or other processing systems. In one variation, various aspects are directed toward one or more computer systems capable of carrying out the functionality described herein. An example of such a computer system 1900 is shown in FIG. 19.

Computer system 1900 includes one or more processors, such as processor 1904. The processor 1904 may be connected to a communication infrastructure 1906 (e.g., a communications bus, cross-over bar, or network). Various software aspects are described in terms of this example computer system. After reading this description, it will become apparent to a person skilled in the relevant art(s) how to implement the aspects hereof using other computer systems and/or architectures.

Computer system 1900 may include a display interface 1902 that forwards graphics, text, and other data from the communication infrastructure 1906 (or from a frame buffer not shown) for display on the display unit 1930. Computer system 1900 also includes a main memory 1908, preferably random access memory (RAM), and may also include a secondary memory 1910. The secondary memory 1910 may include, for example, a hard disk drive 1912 and/or a removable storage drive 1914, representing a floppy disk drive, a magnetic tape drive, an optical disk drive, etc. The removable storage drive 1914 may read from and/or write to a removable storage unit 1918 in a well-known manner. Removable storage unit 1918, may represent a floppy disk, magnetic tape, optical disk, etc., which is read by and written to removable storage drive 1914. As will be appreciated, the removable storage unit 1918 may include a computer usable storage medium having stored therein computer software and/or data.

In alternative variations, secondary memory 1910 may include other similar devices for allowing computer programs or other instructions to be loaded into computer system 1900. Such devices may include, for example, a removable storage unit 1922 and an interface 1920. Examples of such may include a program cartridge and cartridge interface (such as that found in video game devices), a removable memory chip (such as an erasable programmable read only memory (EPROM), or programmable read only memory (PROM)) and associated socket, and other removable storage units 1922 and interfaces 1920, which allow software and data to be transferred from the removable storage unit 1922 to computer system 1900.

Computer system 1900 may also include a communications interface 1924. Communications interface 1924 allows software and data to be transferred between computer system 1900 and external devices. Examples of communications interface 1924 may include a modem, a network interface (such as an Ethernet card), a communications port, a Personal Computer Memory Card International Association (PCMCIA) slot and card, etc. Software and data transferred via communications interface 1924 may be in the form of signals 1928, which may be electronic, electromagnetic, optical or other signals capable of being received by communications interface 1924. These signals 1928 may be provided to communications interface 1924 via a communications path (e.g., channel) 1926. This path 1926 may carry signals 1928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1914, a hard disk installed in hard disk drive 1912, and signals 1928. These computer program products provide software to the computer system 1900. Aspects of the invention are directed to such computer program products.

Computer programs (also referred to as computer control logic) are stored in main memory 1908 and/or secondary memory 1910. Computer programs may also be received via communications interface 1924. Such computer programs, when executed, enable the computer system 1900 to perform the features in accordance with aspects of the invention, as discussed herein. In particular, the computer programs, when executed, enable the processor 1904 to perform such features. Accordingly, such computer programs represent controllers of the computer system 1900.

In a variation where aspects of the present disclosure are implemented using software, the software may be stored in a computer program product and loaded into computer system 1900 using removable storage drive 1914, hard drive 1912, or communications interface 1924. The control logic (software), when executed by the processor 1904, may cause the processor 1904 to perform the functions as described herein. In another variation, aspects of the present disclosure are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present disclosure are implemented using a combination of both hardware and software.

Figure 20:
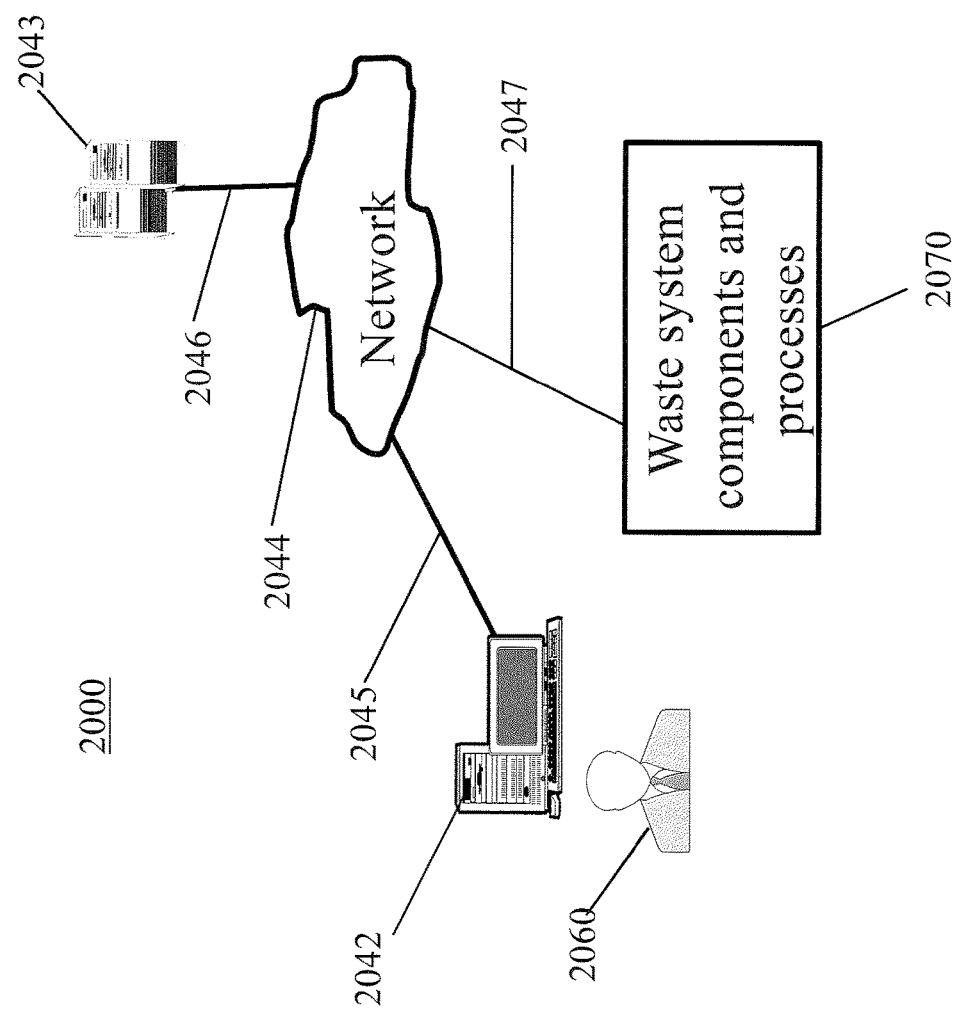
FIG. 20 is a block diagram of various example system components on a network for use in accordance with aspects of the present disclosure.

As shown in FIG. 20, in an example implementation of a system 2000 in accordance with aspects of the present disclosure, various features for use in conjunction with systems and methods in accordance with aspects of present disclosure, including, but not limited to a control system for managing and/or controlling the monitoring, operation, and/or interoperation of various processing devices and processes within a waste processing system 2070 may, for example, be accessed by an accessor 2060 (also referred to interchangeably herein as a "user") via a terminal 2042, such as a personal computer (PC), minicomputer, mainframe computer, microcomputer, telephonic device, or wireless device, such as a hand-held wireless device coupled to a server 2043, such as a PC, minicomputer, mainframe computer, microcomputer, or other device having a processor and a repository for data and/or coupling to a processor and/or repository for data, via, for example, a network 2044, such as the Internet or an intranet, and couplings 2045, 2046, 2047. The couplings 2045, 2046, 2047 may include, for example, wired, wireless, or fiber optic links. In another example implementation, a method and system in accordance with aspects of the present disclosure may operate in a stand-alone environment, such as on a single terminal.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A system for processing a feedstock into energy products or usable byproducts having variable preselected characteristics, the system comprising:
   a conveyor for conveying the feedstock;
   an analyzer to analyze characteristics of the conveyed feedstock;
   a pre-shredder to reduce initial component size in the conveyed feedstock into a selected feedstock subcomponent size;
   a mechanical separator to separate the selected feedstock into discreet conveyable feedstock streams;
   a dryer for reducing moisture content of the separated feedstock;
   a thermal screw for heat processing the dried feedstock; and
   a control system to selectively control operation of the conveyor, the analyzer, the pre-shredder, the mechanical separator, the dryer, and the thermal screw so as to selectively vary an output of resulting products or usable byproducts of the feedstock.

2. The system of claim 1, wherein the pre-shredder comprises a pulverizer.

3. The system of claim 1, further comprising a magnetic separator for separating magnetic materials from the feedstock.

4. The system of claim 3, wherein the magnetic separator separates non-ferrous materials from ferrous materials.

5. The system of claim 3, wherein the magnetic separator comprises an eddy current separator.

6. The system of claim 1, further comprising a ballistic separator.

7. The system of claim 1, wherein the feedstock includes two dimensional and three dimensional components, and where a ballistic separator separates the two dimensional and the three dimensional feedstock into separate streams of the conveyed feedstock.

8. The system of claim 1, wherein the feedstock includes fines, and wherein the mechanical separator separates the fines from the conveyed feedstock.

9. The system of claim 1, further comprising:
a quality inspection platform.

10. The system of claim 1, wherein the dryer comprises at least one cyclone.

11. The system of claim 1, further comprising:
a baler for baling the feedstock.

12. The system of claim 11, further comprising:
a wrapper for wrapping the baled feedstock.

13. The system of claim 1, wherein the thermal screw comprises a pyrolizer.

14. The system of claim 1, wherein the feedstock is processed by the thermal screw to produce syngas.

15. The system of claim 1, wherein the feedstock is processed by the thermal screw to produce biochar.

16. The system of claim 1, wherein the usable byproducts include water.

17. A control system for processing feedstock into energy products or usable byproducts, the control system comprising:
a processor;
a memory coupled to the processor; and
a plurality of processing components operably coupled to the processor and the memory, the processor and memory being selectably operable to vary characteristics of the energy products or usable byproducts produced thereby, the plurality of processing components including:
a conveyor for conveying the feedstock;
an analyzer to analyze characteristics of the feedstock;
a pre-shredder to reduce initial component size in the conveyed feedstock into a selected feedstock sub-component size;
a mechanical separator to separate the pulverized feedstock into discreet conveyable feedstock streams;
a dryer for reducing moisture content of the feedstock; and
a thermal screw for heat processing the feedstock.

18. The control system of claim 17, wherein the pre-shredder comprises a pulverizer.

19. The control system of claim 17, further comprising a magnetic separator for separating magnetic materials from the feedstock, wherein the magnetic separator separates non-ferrous materials from ferrous materials.

20. The control system of claim 17, further comprising a ballistic separator for separating two dimensional feedstock and three dimensional feedstock into separate streams of the conveyed feedstock.

* * * * *